US 8,605,786 B2

(12) United States Patent
Nguyen et al.

(10) Patent No.: US 8,605,786 B2
(45) Date of Patent: Dec. 10, 2013

(54) HIERARCHICAL MOTION VECTOR PROCESSING METHOD, SOFTWARE AND DEVICES

(75) Inventors: Truong Nguyen, San Diego, CA (US); Ai-Mei Huang, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 670 days.

(21) Appl. No.: 12/670,041

(22) PCT Filed: Sep. 3, 2008

(86) PCT No.: PCT/US2008/010334
§ 371 (c)(1),
(2), (4) Date: Jul. 12, 2010

(87) PCT Pub. No.: WO2009/032255
PCT Pub. Date: Mar. 12, 2009

(65) Prior Publication Data
US 2011/0129015 A1    Jun. 2, 2011

Related U.S. Application Data

(60) Provisional application No. 60/967,364, filed on Sep. 4, 2007.

(51) Int. Cl.
*H04N 7/12* (2006.01)
(52) U.S. Cl.
USPC .................................................. 375/240.16
(58) Field of Classification Search
USPC .................................................. 375/240.16
See application file for complete search history.

(56) References Cited

U.S. PATENT DOCUMENTS

| | | | | |
|---|---|---|---|---|
| 1,265,389 A | * | 5/1918 | Rushton | 105/166 |
| 4,969,204 A | * | 11/1990 | Jones et al. | 382/240 |
| 6,081,622 A | * | 6/2000 | Carr et al. | 382/236 |
| 6,157,677 A | * | 12/2000 | Martens et al. | 375/240.16 |
| 6,208,692 B1 | * | 3/2001 | Song et al. | 375/240.19 |
| 6,272,180 B1 | * | 8/2001 | Lei | 375/240.16 |

(Continued)

OTHER PUBLICATIONS

Alaprone, M. et. al., "Adaptively weighted vector-median filters for motion-fields smoothing" *Proc. ICASSP '96*, vol. 4, pp. 2267-2270, May 1996.

(Continued)

*Primary Examiner* — David Czekaj
*Assistant Examiner* — Kehinde O Abimbola
(74) *Attorney, Agent, or Firm* — Greer, Burns & Crain Ltd.

(57) ABSTRACT

A preferred method for hierarchical motion vector processing determines reliability levels of blocks in image data according to residual energy levels. Macroblocks of an image frame are merged according to reliability levels of the motion vectors of blocks. Single motion vectors are selected for merged macroblocks. Motion vectors of blocks merged in the step of merging are iteratively assigned by minimizing the bi-directional prediction difference on successively smaller merged blocks. The reliability levels are preferably determined by measure residual energy of both chrominance and luminance components. In preferred embodiments, motion vector correlation is used to assist the MV reliability classification and the merging and iterative assignment. Refinement and smoothing can be conducted on successively finer block sizes. Additionally, preferred methods account for occlusions by choosing only one of forward or backward prediction for occlusion regions depending upon the class of the occlusion. Results of motion vector classification of the invention can be used in motion compensated frame interpolation and other techniques.

18 Claims, 4 Drawing Sheets

(56) References Cited

U.S. PATENT DOCUMENTS

| | | | |
|---|---|---|---|
| 6,345,126 B1 * | 2/2002 | Vishwanath et al. | 382/253 |
| 6,396,423 B1 * | 5/2002 | Laumen et al. | 341/95 |
| 6,400,763 B1 * | 6/2002 | Wee | 375/240.16 |
| 6,408,101 B1 * | 6/2002 | Krishnamurthy et al. | 382/240 |
| 6,489,995 B1 * | 12/2002 | Kok et al. | 348/416.1 |
| 6,549,575 B1 * | 4/2003 | Butter et al. | 375/240.16 |
| 6,628,819 B1 * | 9/2003 | Huang et al. | 382/154 |
| 6,671,416 B2 * | 12/2003 | Vishwanath et al. | 382/253 |
| 6,765,964 B1 * | 7/2004 | Conklin | 375/240.14 |
| 6,842,483 B1 * | 1/2005 | Au et al. | 375/240.16 |
| 6,859,558 B2 * | 2/2005 | Hong | 382/236 |
| 6,879,268 B2 * | 4/2005 | Karczewicz | 341/67 |
| 6,925,124 B2 * | 8/2005 | Lunter et al. | 375/240.16 |
| 6,963,605 B2 * | 11/2005 | Laurent-Chatenet | 375/240 |
| 6,985,526 B2 * | 1/2006 | Bottreau et al. | 375/240.1 |
| 6,990,145 B2 * | 1/2006 | Monro et al. | 375/240.12 |
| 6,999,513 B2 * | 2/2006 | Sohn et al. | 375/240.16 |
| 7,200,174 B2 * | 4/2007 | Lainema et al. | 375/240.16 |
| 7,200,275 B2 * | 4/2007 | Srinivasan et al. | 382/239 |
| 7,203,237 B2 * | 4/2007 | Fernandes | 375/240.16 |
| 7,206,456 B2 * | 4/2007 | Hannuksela et al. | 382/243 |
| 7,224,733 B1 * | 5/2007 | Benzler et al. | 375/240.17 |
| 7,227,893 B1 * | 6/2007 | Srinivasa et al. | 375/240.08 |
| 7,257,252 B2 * | 8/2007 | Xu | 382/173 |
| 7,260,148 B2 * | 8/2007 | Sohm | 375/240.16 |
| 7,266,149 B2 * | 9/2007 | Holcomb et al. | 375/240.12 |
| 7,277,580 B2 * | 10/2007 | Xu | 382/173 |
| 7,289,562 B2 * | 10/2007 | Yan et al. | 375/240.03 |
| 7,301,999 B2 * | 11/2007 | Filippini et al. | 375/240.03 |
| 7,327,791 B1 * | 2/2008 | Sekiguchi et al. | 375/240.27 |
| 7,339,632 B2 * | 3/2008 | Weitbruch et al. | 348/797 |
| 7,341,840 B2 * | 3/2008 | Serhan et al. | 435/7.2 |
| 7,342,962 B2 * | 3/2008 | Fernandes | 375/240.02 |
| 7,359,562 B2 * | 4/2008 | Raskar et al. | 382/254 |
| 7,366,237 B2 * | 4/2008 | Yu et al. | 375/240.16 |
| 7,394,856 B2 * | 7/2008 | Bhaskaran | 375/240.29 |
| 7,397,854 B2 * | 7/2008 | Kwon et al. | 375/240.03 |
| 7,400,679 B2 * | 7/2008 | Kwon et al. | 375/240.03 |
| 7,412,102 B2 * | 8/2008 | Srinivasan et al. | 382/236 |
| 7,424,055 B2 * | 9/2008 | Liang et al. | 375/240.01 |
| 7,433,497 B2 * | 10/2008 | Chen | 382/107 |
| 7,447,337 B2 * | 11/2008 | Zhang et al. | 382/107 |
| 7,466,864 B2 * | 12/2008 | Nakaya | 382/232 |
| 7,486,826 B2 * | 2/2009 | Sung et al. | 382/191 |
| 7,496,141 B2 * | 2/2009 | Kwon et al. | 375/240.03 |
| 7,508,325 B2 * | 3/2009 | Monro | 341/50 |
| 7,515,734 B2 * | 4/2009 | Horovitz et al. | 382/100 |
| 7,526,102 B2 * | 4/2009 | Ozer | 382/103 |
| 7,526,142 B2 * | 4/2009 | Sheraizin et al. | 382/275 |
| 7,555,167 B2 * | 6/2009 | Srinivasan et al. | 382/239 |
| 7,577,200 B2 * | 8/2009 | Holcomb et al. | 375/240.16 |
| 7,602,851 B2 * | 10/2009 | Lee et al. | 375/240.25 |
| 7,606,312 B2 * | 10/2009 | Conklin | 375/240.24 |
| 7,609,763 B2 * | 10/2009 | Mukerjee et al. | 375/240.16 |
| 7,616,692 B2 * | 11/2009 | Holcomb et al. | 375/240.16 |
| 7,623,574 B2 * | 11/2009 | Holcomb | 375/240.16 |
| 7,630,442 B2 * | 12/2009 | Sekiguchi et al. | 375/240.27 |
| 7,649,947 B2 * | 1/2010 | Morley et al. | 375/240.29 |
| 7,676,101 B2 * | 3/2010 | Sato et al. | 382/238 |
| 7,697,608 B2 * | 4/2010 | Lee | 375/240.03 |
| 7,706,444 B1 * | 4/2010 | Conklin | 375/240.14 |
| 7,724,969 B2 * | 5/2010 | Nakaya | 382/233 |
| 7,734,145 B2 * | 6/2010 | Xue | 386/278 |
| 7,783,118 B2 * | 8/2010 | Zhou | 382/236 |
| 7,783,459 B2 * | 8/2010 | Rozell et al. | 702/189 |
| 7,840,074 B2 * | 11/2010 | Trifonov et al. | 382/199 |
| 7,865,015 B2 * | 1/2011 | Chen et al. | 382/173 |
| 7,869,501 B2 * | 1/2011 | Park et al. | 375/240.01 |
| 7,899,206 B2 * | 3/2011 | Horovitz et al. | 382/100 |
| 7,903,892 B2 * | 3/2011 | Oldcorn et al. | 382/239 |
| 7,916,796 B2 * | 3/2011 | Yan | 375/240.27 |
| 7,924,920 B2 * | 4/2011 | Hsu et al. | 375/240.15 |
| 7,925,053 B2 * | 4/2011 | Altherr | 382/107 |
| 7,929,610 B2 * | 4/2011 | Sun | 375/240.16 |
| 7,929,616 B2 * | 4/2011 | Hagai et al. | 375/240.29 |
| 7,933,456 B2 * | 4/2011 | Han et al. | 382/233 |
| 7,944,977 B2 * | 5/2011 | Hagai et al. | 375/240.29 |
| 7,961,963 B2 * | 6/2011 | Sun | 382/240 |
| 7,974,345 B2 * | 7/2011 | Kondo et al. | 375/240.16 |
| 7,974,488 B2 * | 7/2011 | Monro | 382/260 |
| 8,009,739 B2 * | 8/2011 | Holcomb et al. | 375/240.25 |
| 8,023,561 B1 * | 9/2011 | Garrido et al. | 375/240.15 |
| 8,040,949 B2 * | 10/2011 | Cosman et al. | 375/240.16 |
| 8,050,325 B2 * | 11/2011 | Zhou et al. | 375/240.16 |
| 8,064,520 B2 * | 11/2011 | Mukerjee et al. | 375/240.15 |
| 8,064,522 B2 * | 11/2011 | Kondo et al. | 375/240.16 |
| 8,064,644 B2 * | 11/2011 | Kokaram | 382/107 |
| 8,073,048 B2 * | 12/2011 | Tourapis et al. | 375/240.01 |
| 8,107,529 B2 * | 1/2012 | Tanaka et al. | 375/240.06 |
| 8,155,195 B2 * | 4/2012 | Regunathan et al. | 375/240.16 |
| 8,189,656 B2 * | 5/2012 | Ma et al. | 375/240.01 |
| 8,204,131 B2 * | 6/2012 | Zador et al. | 375/240.25 |
| 8,218,637 B2 * | 7/2012 | Kondo et al. | 375/240.16 |
| 8,244,054 B2 * | 8/2012 | Lin et al. | 382/268 |
| RE43,709 E * | 10/2012 | Hong | 382/236 |
| 8,379,734 B2 * | 2/2013 | Teng et al. | 375/240.27 |
| 2001/0002205 A1 * | 5/2001 | Beattie | 375/240.12 |
| 2001/0017887 A1 * | 8/2001 | Furukawa et al. | 375/240.03 |
| 2002/0057741 A1 * | 5/2002 | Lainema et al. | 375/240.16 |
| 2002/0075959 A1 * | 6/2002 | Dantwala | 375/240.16 |
| 2002/0114394 A1 * | 8/2002 | Ma | 375/240.16 |
| 2002/0159518 A1 * | 10/2002 | Bottreau et al. | 375/240.1 |
| 2003/0086499 A1 * | 5/2003 | Lunter et al. | 375/240.16 |
| 2003/0099295 A1 * | 5/2003 | Averbuch et al. | 375/240.16 |
| 2003/0152149 A1 * | 8/2003 | Denolf | 375/240.24 |
| 2003/0198293 A1 * | 10/2003 | Chen et al. | 375/240.16 |
| 2003/0202592 A1 * | 10/2003 | Sohn et al. | 375/240.16 |
| 2003/0202596 A1 * | 10/2003 | Lainema et al. | 375/240.16 |
| 2004/0001544 A1 * | 1/2004 | Mehrotra | 375/240.1 |
| 2004/0091047 A1 * | 5/2004 | Paniconi et al. | 375/240.16 |
| 2004/0151247 A1 * | 8/2004 | Sanson et al. | 375/240.16 |
| 2004/0190607 A1 * | 9/2004 | Wakimoto et al. | 375/240.01 |
| 2004/0190624 A1 * | 9/2004 | Kondo et al. | 375/240.16 |
| 2004/0228410 A1 * | 11/2004 | Ameres et al. | 375/240.18 |
| 2004/0258154 A1 * | 12/2004 | Liu et al. | 375/240.16 |
| 2005/0013372 A1 * | 1/2005 | Srinivasan | 375/240.16 |
| 2005/0031037 A1 * | 2/2005 | Carrasco et al. | 375/240.16 |
| 2005/0053141 A1 * | 3/2005 | Holcomb et al. | 375/240.16 |
| 2005/0053142 A1 * | 3/2005 | Holcomb et al. | 375/240.16 |
| 2005/0053143 A1 * | 3/2005 | Holcomb et al. | 375/240.16 |
| 2005/0053144 A1 * | 3/2005 | Holcomb | 375/240.16 |
| 2005/0053145 A1 * | 3/2005 | Hsu et al. | 375/240.16 |
| 2005/0053147 A1 * | 3/2005 | Mukerjee et al. | 375/240.16 |
| 2005/0053148 A1 * | 3/2005 | Mukerjee | 375/240.16 |
| 2005/0053149 A1 * | 3/2005 | Mukerjee et al. | 375/240.16 |
| 2005/0058201 A1 * | 3/2005 | Fernandes | 375/240.16 |
| 2005/0058202 A1 * | 3/2005 | Fernandes | 375/240.16 |
| 2005/0058203 A1 * | 3/2005 | Fernandes | 375/240.16 |
| 2005/0058204 A1 * | 3/2005 | Fernandes | 375/240.16 |
| 2005/0084009 A1 * | 4/2005 | Furukawa et al. | 375/240.03 |
| 2005/0084016 A1 * | 4/2005 | Yamaguchi et al. | 375/240.21 |
| 2005/0135486 A1 * | 6/2005 | Lee | 375/240.16 |
| 2005/0141614 A1 * | 6/2005 | Braspenning et al. | 375/240.16 |
| 2005/0169379 A1 * | 8/2005 | Shin et al. | 375/240.16 |
| 2005/0175099 A1 * | 8/2005 | Sarkijarvi et al. | 375/240.16 |
| 2005/0201462 A1 * | 9/2005 | Ridge et al. | 375/240.16 |
| 2005/0207495 A1 * | 9/2005 | Ramasastry et al. | 375/240.16 |
| 2005/0207497 A1 * | 9/2005 | Rovati et al. | 375/240.16 |
| 2005/0207500 A1 * | 9/2005 | Bober | 375/240.22 |
| 2005/0208596 A1 * | 9/2005 | Siegel | 435/7.2 |
| 2005/0213663 A1 * | 9/2005 | Aoyama et al. | 375/240.16 |
| 2005/0265451 A1 * | 12/2005 | Shi et al. | 375/240.15 |
| 2005/0276329 A1 * | 12/2005 | Adiletta et al. | 375/240.16 |
| 2005/0281334 A1 * | 12/2005 | Walker et al. | 375/240.16 |
| 2005/0286638 A1 * | 12/2005 | Watanabe | 375/240.16 |
| 2006/0013310 A1 * | 1/2006 | Lee et al. | 375/240.16 |
| 2006/0013321 A1 * | 1/2006 | Sekiguchi et al. | 375/240.27 |
| 2006/0018382 A1 * | 1/2006 | Shi et al. | 375/240.16 |
| 2006/0018383 A1 * | 1/2006 | Shi et al. | 375/240.16 |
| 2006/0062304 A1 * | 3/2006 | Hsia | 375/240.16 |
| 2006/0078156 A1 * | 4/2006 | Varekamp et al. | 382/100 |
| 2006/0098738 A1 * | 5/2006 | Cosman et al. | 375/240.16 |
| 2006/0104366 A1 * | 5/2006 | Huang et al. | 375/240.27 |
| 2006/0165176 A1 * | 7/2006 | Raveendran et al. | 375/240.16 |

(56) References Cited

U.S. PATENT DOCUMENTS

| | | | |
|---|---|---|---|
| 2006/0203912 A1* | 9/2006 | Kodama | 375/240.16 |
| 2006/0215761 A1* | 9/2006 | Shi et al. | 375/240.16 |
| 2006/0222078 A1* | 10/2006 | Raveendran | 375/240.16 |
| 2006/0256238 A1* | 11/2006 | Mishima et al. | 348/459 |
| 2006/0262853 A1* | 11/2006 | Li et al. | 375/240.16 |
| 2007/0009038 A1* | 1/2007 | Kim et al. | 375/240.16 |
| 2007/0036218 A1* | 2/2007 | Burazerovic | 375/240.16 |
| 2007/0071100 A1* | 3/2007 | Shi et al. | 375/240.16 |
| 2007/0133686 A1* | 6/2007 | Lee et al. | 375/240.16 |
| 2007/0140347 A1* | 6/2007 | Moon et al. | 375/240.16 |
| 2008/0008245 A1* | 1/2008 | Kondo et al. | 375/240.16 |
| 2008/0037642 A1* | 2/2008 | Tsuchiya et al. | 375/240.16 |
| 2008/0089417 A1* | 4/2008 | Bao et al. | 375/240.16 |
| 2008/0159409 A1* | 7/2008 | Yu et al. | 375/240.26 |
| 2008/0253457 A1* | 10/2008 | Moore | 375/240.16 |
| 2008/0267294 A1* | 10/2008 | Fernandes | 375/240.16 |
| 2008/0285806 A1* | 11/2008 | Kokaram | 382/107 |
| 2008/0310512 A1* | 12/2008 | Ye et al. | 375/240.16 |
| 2008/0310514 A1* | 12/2008 | Osamoto et al. | 375/240.16 |
| 2008/0317128 A1* | 12/2008 | Zhou et al. | 375/240.16 |
| 2010/0215106 A1* | 8/2010 | Au et al. | 375/240.16 |
| 2010/0231689 A1* | 9/2010 | Bruls et al. | 348/43 |
| 2010/0290530 A1* | 11/2010 | Huang et al. | 375/240.16 |
| 2011/0110427 A1* | 5/2011 | Teng et al. | 375/240.16 |
| 2011/0129015 A1* | 6/2011 | Nguyen et al. | 375/240.16 |
| 2012/0044997 A1* | 2/2012 | Zhou et al. | 375/240.16 |
| 2012/0044998 A1* | 2/2012 | Kokaram | 375/240.16 |
| 2012/0294371 A1* | 11/2012 | Kitahara et al. | 375/240.16 |
| 2012/0294372 A1* | 11/2012 | Kitahara et al. | 375/240.16 |
| 2012/0307908 A1* | 12/2012 | Kitahara et al. | 375/240.16 |
| 2012/0320985 A1* | 12/2012 | Kitahara et al. | 375/240.16 |
| 2012/0320986 A1* | 12/2012 | Shimizu et al. | 375/240.16 |
| 2013/0022124 A1* | 1/2013 | Sekiguchi et al. | 375/240.16 |

OTHER PUBLICATIONS

Astola, P. Haavisto, et. al., "Vector median filters", *IEEE Proc.*, vol. 78, pp. 678-689, Apr. 1990.

Blume, H. et. al., "Objected based refinement of motion vector field aapplyinh probabilistic homogenization rules", *IEEE Trans Consumer Electron*, vol. 48, No. 3, pp. 694-701, Aug. 2002.

Chen, T., "Adaptive temporal interpolation using bidirectional motion estimation and compensation", *Proc. ICIP '02*, vol. 2, pp. 313-317, Sep. 2002.

Choi, et al., "Frame rate upconversion using perspective transform", *IEEE Trans. Consumer Electron.*, vol. 52, pp. 975-982, Aug. 2006.

Dane, G., et. al. "Motion vector processing for frame rate up conversion", *Proc. ICASSP '04*, vol. 3, pp. 309-312, May 2004.

Dane, G., et. al.. "Smooth motion vector resampling for standard compatible video post-processing," *Proc. Asilomar Con? Signals, Systems and Computers*, 2004.

Dane, et. al., "Encoder-assisted adaptive video frame interpolation", *Proc. ICASSP '05*, vol. 2, pp. 349-352, 2005.

Dane, G., et. at., "Optimal temporal interpolation filter for motion-compensated frame rate up conversion." *IEEE Trans. Image Processing*, vol. 15, pp. 978-991, Apr. 2006.

Fujiwars, S., et. al. "Motion-compensated frame rate upconversion based on block matching algorithm with multi-size blocks", *Proc. International Symposium on Intelligent Signal Processing and Communication Systems 05*, pp. 353-356, Dec. 2005.

Ha, T. et. al., "Motion compensated frame interpolation by new block-based motion estimation algorithm", *IEEE Trans. Consumer Electron*, vol. 50, No. 2, pp. 752-759, May 2004.

Haan, G., et al., "True-motion estimation with 3-D recursive search block matching" IEEE Trans. Circuit and System for Video Technology, vol. 3, No. 5, pp. 368-379, Oct. 1993.

Krishnamurthy, R., et. al., "Frame interpolation and biodirectional prediction of video using capacity encoded optical-flow fields and label fields," *IEEE Trans. Circuit and System for Video Technology*, vol. 9, No. 5, pp. 713-726, Aug. 1999.

Lee, S. H., et. al., "Weighted-adaptive motion-compensated frame rate up-conversion", *IEEE Trans. Consumer Electron.*, vol. 49, No. 3, pp. 485-492, Aug. 2003.

Ojo, O.A., et. al., "Robust motion-compensated video upconversion", *IEEE Trans. Consumer Electron.*, vol. 43, No. 4, pp. 1045-1056, Nov. 1997.

Sasai, S. Kondon, et. al., "Frame-rate up-conversion using reliable analysis of transmitted motion information",*Proc. ICASSP '04*, vol. 5, pp. 257-260, May 2004.

Sekiguchi, S., et.al., "A low-cost video frame-rate up conversion using compressed-domain information", Proc. ICIP '05, voi. 2, pp. 974-977. Sep. 2005.

Wang, Z., et. al., "image quality assessment: From error visibility to structure similarity," *IEEE Transactions on Image Processing*, vol. 13, No. 4, pp. 600-612, Apr. 2004.

Wang, J. et. at, "A fast block-based motion compensated video frame interpolation approach", *Proc. 04,.*

ZHAi, J., et al., "A low complexity motion compensated frame interpolation method,"*Proc. ISCAS '05*, vol. 2, pp. 4927-4930, Sep. 2005.

Zhang, L. Sun, et. al., Position rediction montioncompensated interpolation for frame-rate up-conversion using temporal modeling, *Proc. ICIP '05*, 2005.

Al-Mei Huang and Truong Nguyen, "Motion Vector Processing Based on Residual Energy Information for Motion Compensated Frame Interpolation", IEEE, Sep. 6, 2006, pp. 2721-724.

* cited by examiner single (16x16)

right (32x16)

down (16x32)

diagonal right-down down-right corner all (32x32)

HIERARCHICAL MOTION VECTOR PROCESSING METHOD, SOFTWARE AND DEVICES

PRIORITY CLAIM AND REFERENCE TO RELATED APPLICATION

This application claims priority under 35 U.S.C. §119 from prior provisional application Ser. No. 60/967,364, filed Sep. 4, 2007.

FIELD

A field of the invention is image and video coding. The invention is applicable to any image and video processing and compression applications that make use of motion vectors. A specific application of the invention is to motion compensated frame interpolation (MCFI).

BACKGROUND

Motion-compensated frame interpolation (MCFI) that uses the received motion vectors (MVs) has recently been studied to improve temporal resolution by doubling the frame rate at the decoder. MCFI is particularly useful for video applications that have low bandwidth requirements and need to reduce frame rate to improve spatial quality. In MCFI, the skipped frame is often interpolated based on the received motion vector field (MVF) between two consecutive reconstructed frames, denoted by $f_{t-1}$ and $f_{t+1}$ respectively. Based on the assumption that objects move along the motion trajectory, the skipped frame $f_t$ can be interpolated bi-directionally using the following equation:

$$f_t(x, y) = w_f \cdot f_{t-1}\left(x + \frac{1}{2}v_x \cdot y + \frac{1}{2}v_y\right) + w_b \cdot f_{t+1}\left(x - \frac{1}{2}v_x \cdot y - \frac{1}{2}v_y\right). \quad (1)$$

where $v=(v_x, v_y)$ is the received MVF in the bit stream for reconstructing the frame $f_{t+1}$, and $w_f$ and $w_b$ are the weights for the forward and backward predictions, respectively, which are often set to 0.5. This frame interpolation method is also called the direct MCFI as it assumes that the received MVs can represent true motion and can directly be used. However, MCFI that directly uses the received MVs often suffers from annoying artifacts such as blockiness and ghost effects.

In general, it is difficult and costly in terms of coding efficiency for an encoder to capture all the true motions in a video frame using block-based motion estimation. It is also not realistic to assume that all encoders are made aware of the fact that skipped frames will be interpolated at the decoder. Even though MVs can be re-estimated at the decoder by considering spatial and temporal correlations, the true motion can easily be distorted due to coding artifacts such as blockiness and blurriness. Those MV processing methods that remove outliers using vector median filters or refine MVs using smaller block sizes can only perform well when the video has smooth and regular motions. That is, they are based on the assumption that the MVF should be smooth. However, this is usually not true as a video frame may contain complex motions, especially on the motion boundaries, where the true motion field is not smooth at all. As a result, many irregular motions may appear in the received MVF and dominate the vector median filtering process to take those irregular MVs as the true motion. In addition, since many of the methods only operate on a smaller block size, they often fail to consider the edge continuity and the structure of the objects. When several macro blocks (MBs) in the same neighborhood have irregular MVs due to multiple objects moving in different directions, the structure of the objects usually cannot be maintained. MBs that are intra-coded also make frame interpolation difficult as their MVs are not available. Some methods use object based motion estimation and/or interpolation at the decoder to maintain the object structure and minimize the interpolation error. However, high computational complexity prevent such methods from being used in resource limited devices such as mobile phones. Therefore, frame interpolation still remains a very challenging problem as the artifacts due to the use of improper MVs can be very noticeable, unless an extremely complex method is used.

SUMMARY OF THE INVENTION

A preferred method for hierarchical motion vector processing determines reliability levels of blocks in image data according to residual energy levels. Macroblocks of an image frame are merged according to reliability levels of the motion vectors of blocks. Single motion vectors are selected for merged macroblocks. Motion vectors of blocks merged in the step of merging are iteratively assigned by minimizing the bi-directional prediction difference on successively smaller merged blocks. The reliability levels are preferably determined by measure residual energy of both chrominance and luminance components. In preferred embodiments, motion vector correlation is used to assist the MB merging and iterative MV assignment. Refinement and smoothing can be conducted on successively finer block sizes. Additionally, preferred methods account for occlusions by choosing only one of forward or backward prediction for occlusion regions depending upon the class of the occlusion and the MVF distribution. Results of motion vector classification of the invention can be used in motion compensated frame interpolation and other techniques.

BRIEF DESCRIPTION OF THE DRAWINGS

FIG. 3A shows an example motion vector filed prior to merging; FIG. 3B shows the motion vector field after merging and motion selection; FIG. 3C shows a reclassification map for motion refinement.

DETAILED DESCRIPTION OF THE PREFERRED EMBODIMENTS

Figure 1:
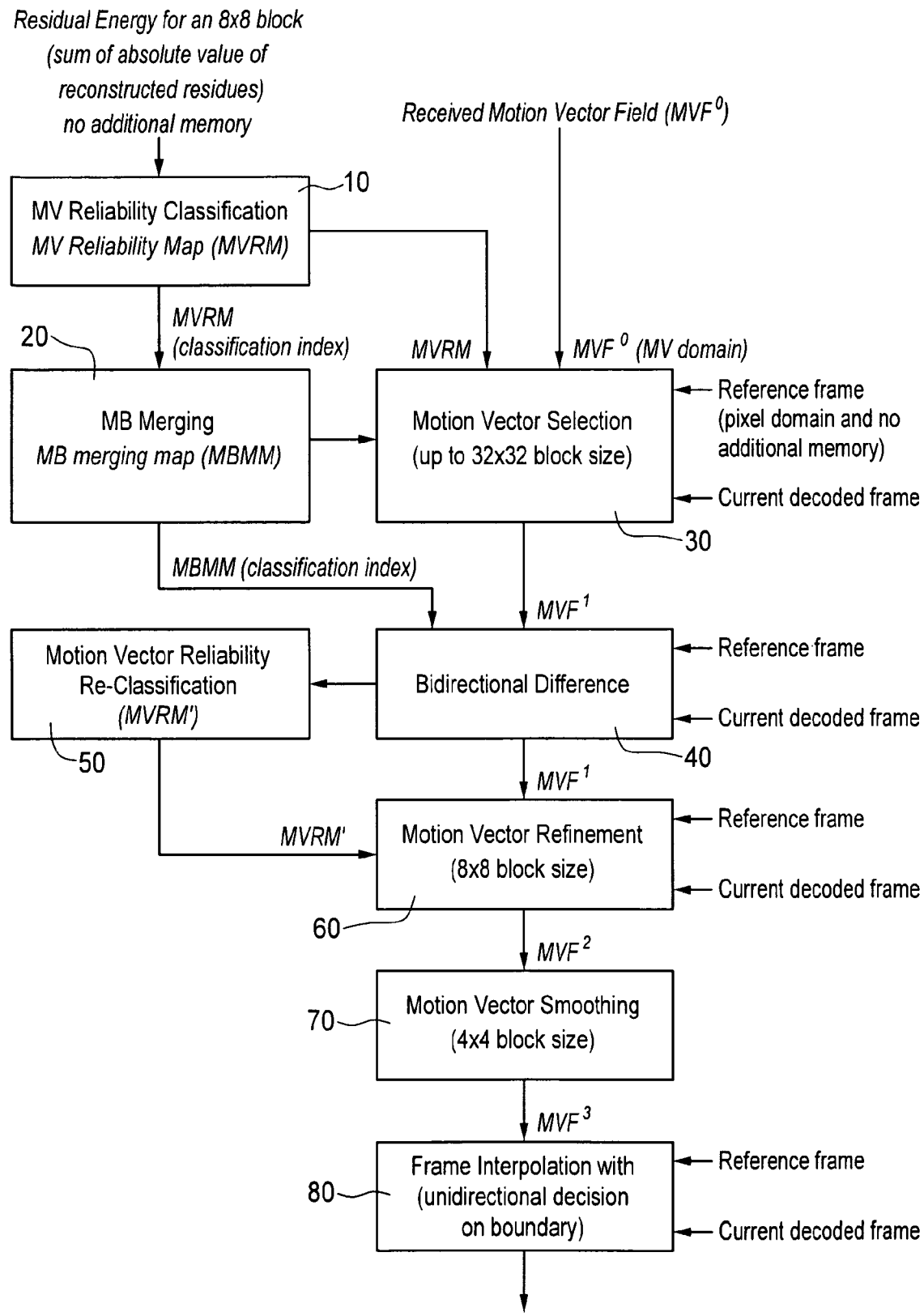
FIG. 1 illustrates a preferred embodiment method of the invention for hierarchical motion vector processing.

The invention includes methods, software and devices making use of a novel, low complexity motion vector processing algorithm. Methods, software, and devices of the invention can, for example, be used on a decoder side for MCFI or frame rate up-conversion. The methods described herein can be implemented as software in various platforms, and can be stored as code in many forms of computer readable media.

A preferred method for hierarchical motion vector processing determines reliability levels of motion vectors in video data according to residual energy levels. Macroblocks of an image frame are merged according to reliability levels of the motion vectors of their sub-blocks. A Single motion vector is selected for each merged group by minimizing the bi-directional prediction difference. Motion vectors of blocks merged in the step of merging are iteratively assigned during the MV selection process. The reliability levels are preferably determined by measure residual energy of both chrominance and luminance components. In preferred embodiments, motion vector correlation is used to assist the merging and iterative assignment. Refinement and smoothing can be conducted on successively finer block sizes. Additionally, preferred methods account for occlusions by choosing only one of forward or backward prediction for occlusion regions depending upon the class of the occlusion and MV distribution. Results of motion vector classification of the invention can be used in motion compensated frame interpolation and other techniques.

In a preferred embodiment method of the invention, problems concerning discontinuous edges and deformed structures in an interpolated frame are avoided through refinement of motion vectors hierarchically depending on different block sizes. The method explicitly considers the reliability of each received motion vector and preserves the structure information by analyzing the distribution of residual energies and effectively merging blocks that have unreliable motion vector. The motion vector reliability information is also used as a priori knowledge in motion vector refinement using a constrained median filter to avoid choosing the same unreliable one. Preferred embodiment methods use both luminance and chrominance information. Experimental results show that example preferred methods have better visual quality and are robust even in video sequences with complex scenes and fast motions.

Embodiments of the invention explicitly address the aforementioned problems in MCFI and provide a successful, yet low-complexity MV processing method that can preserve edges and object structure information without involving motion estimation or object detection at the decoder. In a preferred method, based on the received information, a decoder first step is to identify MVs that most likely produce visual artifacts during the frame interpolation by exploiting the strong correlation between the reliability of a MV and the residual energy it produces. That is, the residual energy of each block is analyzed to determine the reliability of each received MV. Then, before refining those unreliable MVs by further partitioning each block into smaller blocks, the method first merges MBs with unreliable MVs by analyzing the distribution of the residual energies. This MB merging process can effectively group MBs located on the motion boundaries. To prevent a deformed structure, each merged block is assigned one single MV selected from its own and neighboring reliable MVs by minimizing the difference between the forward and backward predictions.

Embodiments of the invention also provide an effective MV refinement method that adaptively adjusts unreliable MVs in smaller blocks (of size 8×8) by applying a reliability and similarity constrained median filter to their neighboring MVs. In such embodiments reliability information of each MV is used as a priori knowledge in the refinement process. In addition, to avoid choosing the same unreliable MV, preferred embodiment methods remove identical or similar MVs in the neighborhood from consideration. To further remove blockiness effect, preferred methods also adopt MV smoothing as in "Correlation-Based Motion Vector Processing with Adaptive Interpolation Scheme for Motion Compensated Frame Interpolation", by Ai-Mei Huang and Truong Nguyen, on an even finer block size (of size 4×4) as final step of MV processing. For MBs on the frame boundaries, unidirectional interpolation can be used by adaptively selecting forward and backward predictions based on the motion. Also, chrominance information is preferably used in MV reliability classification and in all MV processing stages, which proves to be very useful to identify and correct unreliable MVs and has not explicitly been considered in the literature.

Block-based motion compensation is commonly used to reduce temporal redundancy, which can be achieved by estimating MVs that minimize the prediction errors. However, when a block contains more than one motion, one single MV cannot represent all the motions in that block. The invention recognizes and makes use of the consequent fact that higher residual energies on the motion boundaries or along the edges of moving objects are often present. The invention recognizes that if those MVs are used for frame interpolation at the decoder, artifacts are likely to be seen on those areas where the residual energies are high as the estimated MVs do not represent their motions. Experiments have been conduced and have demonstrated a strong correlation between MV reliability and its associated residual energy. That is, when residual energy is high, it is likely that the corresponding MV is not reliable for frame interpolation. With this in mind, embodiments of the invention avoid using such unreliable MVs to interpolate a skipped frame, and also prevent the unreliable MVs from being used to correct other MVs.

Experiments that show such high residual energies are distributed and also show boundaries in resulting interpolated frames where the motion differs. With this in mind, embodiments of the invention groups those blocks that belong to the same object for further processing. The advantage of grouping those blocks for further processing is that the grouping helps avoid having a disconnected structure, which is likely to happen in many prior methods as the MVs of those blocks are usually found differently. Embodiments of the invention analyze the connectivity of the MBs that have high residual energies and group them to avoid deformed structures.

Residual energy is used in embodiments of the invention to assist MV processing by creating a MV reliability map and a MB merging map. The MV reliability map is used to determine the reliability level of each received MV to make sure that unreliable ones are not used and should be corrected. The MB merging map is used to determine whether the neighboring MBs should be grouped together in order to maintain the integrity of the entire moving object.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

FIG. 1 illustrates a preferred embodiment method of the invention. In FIG. 1, a first step is to classify 10 MVs in a received bitstream according to reliability levels and to generate a reliability map. In this embodiment, the reliability determination requires only the residual energy, which is calculated normally by decoders for use in frame reconstruction as it is the encoded difference between the motion compensated block and the original block. An example of an 8×8 block will be considered, as the 8×8 block size for MV reliability classification is that which is used MPEG-4 and H.263, where prediction residues are generated and encoded based on 8×8 block size. If $v_{m,n}$ denotes the MV of each 8×8 block, $b_{m,n}$, classify $v_{m,n}$ into three different reliability levels, reliable, possibly reliable, and unreliable, respectively $L_3$, $L_2$, $L_1$. The classification is preferably based on the MV residual energy of a given block, the reliability level of its neighboring blocks and the coding type. For an MB with only one MV, the same MV can be assigned to all four 8×8 blocks. For each block $b_{m,n}$, first calculate its residual energy, $E_{m,n}$, by taking the sum of the absolute value of each reconstructed prediction error of each pixel. Preferred methods consider both luminance and chrominance residues because motion estimation that only uses pixel values in the luminance domain can result in an incorrect MV that minimizes the luminance difference but provides colors that are mismatched. Therefore, chrominance information is preferably included in the residual energy calculation to identify those incorrect MVs. $E_{m,n}$ can then be represented as the following:

$$E_{m,n} = \sum_{(i,j) \in b_{m,n}^Y} |r_Y(i,j)| + \alpha \cdot \left( \sum_{(i,j) \in b_{m,n}^{Cb}} |r_{Cb}(i,j)| + \sum_{(i,j) \in b_{m,n}^{Cr}} |r_{Cr}(i,j)| \right) \quad (2)$$

is where $r_Y(i, j)$, $r_{Cb}(i, j)$, and $r_{Cr}(i, j)$ are the reconstructed residual signals of Y, Cb and Cr components of the block, $b_{m;n}$, respectively. $\alpha$ is the weight used to emphasize the degree of color difference. The residual signals are normally computed during decoding process for other purposes and there is therefore no additional computation expense in the reliability classification step other than Eqn. (2).

A reliability map including assignments of reliability levels $L_3$, $L_2$, $L_1$ can be constructed in step 10 by assigning reliability levels. The reliability levels are determined by comparing $E_{m,n}$ with a predefined threshold, $\epsilon_1$, to determine if $v_{m,n}$ is unreliable. If $E_{m,n}$ is greater than or equal to $\epsilon_1$, it will be considered as unreliable and inserted into the reliability level $L_1$. For intra-coded MBs, which do not have MVs, temporarily assign zero MVs but consider them as unreliable and put them in $L_1$.

Once an unreliable MV is identified, its neighboring MVs in the same MB and in its eight adjacent MBs will be classified as possibly reliable and placed into the second reliability level $L_2$, even if their residual energy levels are below the threshold. The reason is that when one MB contains at least one block with high residual energy, it is likely that this MB and the surrounding MBs are on the motion boundary. Hence, those MVs may not represent the actual motion, depending on how motion estimation is performed at the encoder. To ensure that all MVs used for frame interpolation are reliable, these MVs are initially classified as possibly reliable, and are subsequently re-evaluated in a later stage of the MV correction method. For example, for a MB with four MVs, if only one block exceeds the threshold, the other three blocks as well as all the MVs in the eight adjacent MBs will be considered to be possibly reliable and put into $L_2$. But if their residual energies are high, they will still be classified into $L_1$ instead of $L_2$.

For those MVs that remain not classified after the initial threshold comparison, i.e., their $E_{m,n}$ are less than $\epsilon_1$, they are classified as reliable and are placed into the third reliability level $L_3$. This permits the creation of a MV reliability map (MVRM) by assigning the reliability level to each MV as the following:

$$MVRM(m,n) = \begin{cases} L_1, & \text{if } E_{m,n} \geq \epsilon_1 \\ L_2, & \text{if any } MV \text{ in the same } MB \text{ or} \\ & \text{in the adjacent } MBs \in L_1, \\ L_3, & \text{otherwise.} \end{cases} \quad (3)$$

An example MV reliability map based on video of a head and shoulders shot of a person was created using the three classification levels, where $\alpha$ was set to 4 and $\epsilon_1$ was set to 1100. The example video demonstrated that since some of the luminance values of the collar of a shirt worn by the person and the person's skin are very similar, some of the wrong MVs can only be detected by chrominance residues instead of merely luminance residues. The tests demonstrated the ability to successfully identify regions where frame interpolation is likely to fail by classifying the MV reliability using both chrominance and luminance.

The threshold value $\epsilon_1$ of 1100 in the example was chosen empirically. It can be argued that this threshold should be video content dependent. It may also depend on the quantization parameter value. However, through abundant experiments, it was discovered that the vector processing method is not very sensitive to this threshold for many different video sequences. The level can accordingly be set with a goal of computational expense in mind. Using a lower value results in more blocks being checked in the correction process. Very small values should be avoided as such values will result in unnecessary correction that may cause performance degradation. A preferred range is approximately 800 to 1500.

A next step in the method involves MB merging 20 according to the motion vector reliability map (MVRM) determined in the classification step 10. In the merging, instead of correcting unreliable MVs separately, they are preferably addressed as a one or a small number of correction units. The size of each correction unit should be determined by the property of high residual connectivity. For example, when the current processing MB contains unreliable MVs, there is a check to see whether there are unreliable MVs of neighboring MBs adjacent to any unreliable MVs within the current MB. If so, most likely these unreliable MVs of are located on the same object edge as high residual energy distributes continuously in this area. As such, unlike conventional blockbased MV correction methods with the fixed correction unit size, an MB merging map is crated to decide which unreliable MVs should be grouped together as a correction unit or be corrected separately.

The merging process can performed on MB basis, and all MBs that contain unreliable MVs can be examined in a raster scan order. For an inter-coded MB that has unreliable MVs, check if its unreliable MVs connect to other unreliable MVs in the adjacent MBs that have not yet been merged. That is, only those MBs that have unreliable MVs connecting to each other in vertical, horizontal and diagonal directions will be merged. If two adjacent MBs that have unreliable MVs but are not next to each other in those three directions, those two MBs will not be merged.

FIGS. 2A-2H illustrate the possible shapes for merging inter-coded MBs that contain at least one unreliable MV and for intra-coded MBs in the merging step of FIG. 1. The possible shapes are used except for the diagonal shape of FIG. 2D. All the MBs that are merged together will be given a single MV in the first stage of the MV processing method of FIG. 1. A 32×32 block size is selected in the example embodiment as the maximum block size after merging. This size permits obtainment of a good MV to maintain the edges of an object on those MBs. Further increasing the block size to 48×48 or larger is found to reduce the quality of the interpolated frame as it is too large to represent all the motions inside. Also, the MV processing method corrects MVs in a larger shape first and then refines MVs in smaller blocks later. Increasing the size of the merged block makes the motion refinement process more computationally expensive.

It is noted that intra-coded MBs are automatically considered in this merging process as their MVs are considered unreliable. It is assumed that the intra-coded MBs adjacent to unreliable MVs have higher prediction errors so that the encoder decides to encode those MBs using the intra-coded mode. If there are no unreliable motion vectors in the neighborhood, this MB will remain as a single 16×16 block.

If an intra-coded MB is encountered in the raster scan order, however, it is only necessary to look for adjacent intra-coded MBs that have not been merged. That is, an inter-coded MB can look for both inter- and intra-coded MBs in the merging process while an intra-coded MB can only find adjacent intra-coded MBs for merging.

Figure 2A:
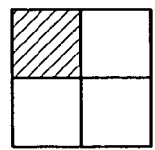
FIGS. 2A-2H illustrates the possible shapes for merging inter-coded MBs that contain at least one unreliable MV and for intra-coded MBs in the merging step of FIG. 1.
Figure 2B:
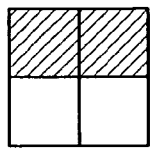
Figure 2C:
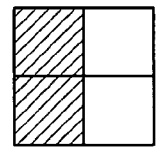
Figure 2D:
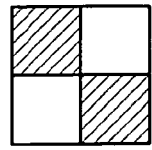
Figure 2E:
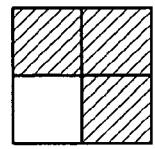
Figure 2F:
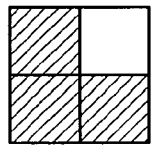
Figure 2G:
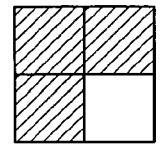
Figure 2H:
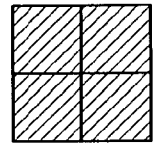

In addition, the diagonal shape in FIG. 2D is not considered for intra-intra MB merging. The possibility of two diagonal intra-coded MBs belonging to the same object is lower. Therefore, there are 8 merging modes for inter-coded MB and 7 modes for intra-coded MB. A MB merging map (MBMM) is created by assigning a unique number to the MBs that are merged, indicating that they should be considered together to find one MV in the MV processing stage.

With the MV reliability map (MVRM) and the MB merging map determined in steps 10 and 20, the MB merging map (MBMM), and the originally received motion vector field (MVF$^0$), a first MV processing stage is to select 30 the best MV for each merged group from its own and neighboring reliable and possibly reliable MVs by minimizing the difference of forward and backward predictions. This is done iteratively. Merged MBs are assigned the selected MV that is used to update MVF$^0$ to MVF$^1$ in step 30. The difference of the forward and backward predictions resulting from the selected MV is then calculated in step 40.

A MV reclassification process 50 is then conducted. This MV reliability reclassification can help subsequent MV processing stages differentiate improper motions as the MVs have been changed and the original residual energy is no longer useful. Unreliable MVs from the second classification are revised based on a block size of 8×8, and those corrected MVs are used to update MVF$^1$ to MVF$^2$ in refinement step 60. This can be viewed as local motion adjustment as compared to the motion selection of step 30 in which a larger block size is considered to find a single MV. Motion smoothing 70 is conducted to reduce any blockiness artifact by increasing the number of MVs based on a smaller block size of 4×4. The denser MVF is denoted by MVF$^3$. After MV processing, step 80 uses a different interpolation strategy for those MBs on the frame boundaries by adaptively selecting unidirectional compensations based on the direction of their MVs.

The method in FIG. 1 provides a hierarchical approach in the sense that the MVs in each merged shape of block size up to 32×32 are first corrected and assigned a single MV, and then this selected MV as well as other possibly reliable MVs are further refined and smoothed based on the successively smaller block sizes of 8×8 and 4×4, respectively. Image quality can gradually be improved after each MV processing stage.

The main purpose of using MB merging to correct unreliable MVs is to preserve edge information and maintain the integrity of moving object structure by finding a single MV. From the MB merging map, the MBs in each merged group have their own MVs and also the neighboring MVs in the adjacent MBs. These MVs are the candidates for the MV election process. That is, in step 30 choose the best MV, $v^*_b$, from these candidates by minimizing the averaged bidirectional prediction difference (ABPD) between the forward and backward predictions.

$$v_b^* = \underset{v \in S}{\operatorname{argmin}}(ABPD(v)), \quad (4)$$

where $$ABPD(v) = \frac{1}{N_G} \sum_{x,y \in G} \left| f_{t-1}\left(x + \frac{1}{2}v_x \cdot y + \frac{1}{2}v_y\right) - f_{t+1}\left(x - \frac{1}{2}v_x \cdot y - \frac{1}{2}v_y\right) \right|.$$

S denotes the set of the MV candidates. G denotes the merged group in one of the 8 possible shapes in FIG. 2.

Once the best MV is found, before it is assigned to the merged MBs in G, a check is conducted to see if the selected MV is good enough by comparing its ABPD with a threshold $\epsilon_2$. If it is less than $\epsilon_2$, the MVs of the merged MBs in G, will be replaced by the new MV $v^*_b$ and marked done. However, if it is larger than or equal to $\epsilon_2$, the selected MV is dropped and this merged group is temporarily skipped to see if some of the neighboring MVs are updated to better ones when other merged groups are corrected. This permits time in the process for a proper MV to propagate to its neighborhood. If the ABPD of the selected MV is still higher than $\epsilon_2$ and the neighboring MVs are no longer updated, then the best MV $v^*_b$ is assigned and it can be refined in the MV refinement stage. The MV selection process stops when all merged groups have been assigned new MVs, or a predefined number of iterations is reached. Simulations were conducted with an iteration number of 2, and with an increase of $\epsilon_2$ to a very high value in the second iteration, which means that all merged blocks are likely to be assigned new MVs.

Figure 3A:
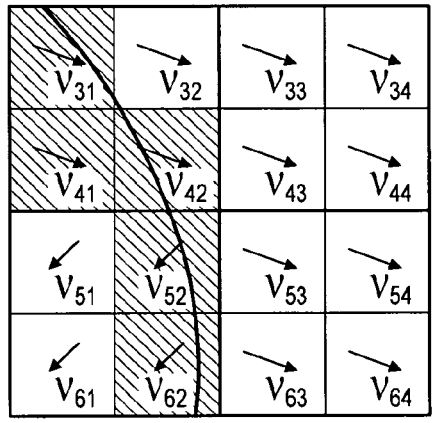
FIGS. 3A-3C illustrates a preferred hierarchical process for motion vector correction used in the FIG. 1 method.
Figure 3B:
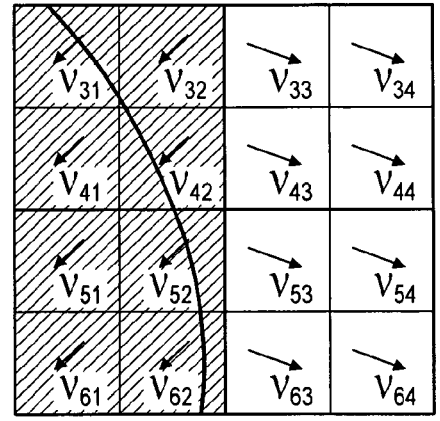
Figure 3C:
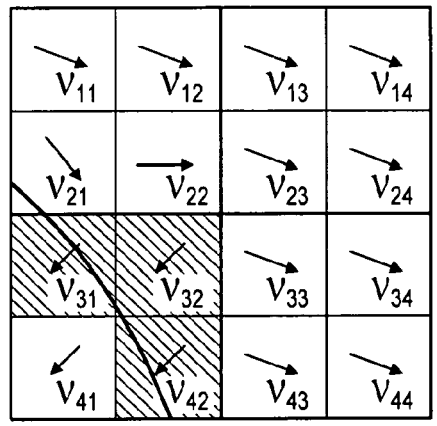
Figure 3D:
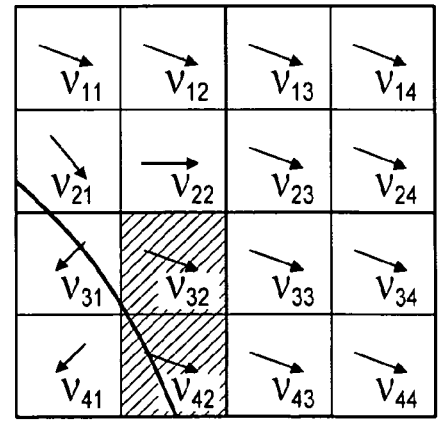
FIG. 3D shows the motion vector field after motion refinement.

FIGS. 3A-3D illustrate an example hierarchical MV process of steps 30, 40, 50, and 60, where each MB has 4 MVs, which are denoted as $v_{mn}$ where "m" and "n" are the row and the column index, respectively. FIG. 3A shows an example motion vector filed prior to merging. FIG. 3B shows the motion vector field after merging a motion selection. FIG. 3C shows a reclassification map for motion refinement. FIG. 3D shows the motion vector field after motion refinement. With respect to FIGS. 3A-3D, assume a moving object whose motion boundary is marked the curved line as in FIG. 3A. The left side of the curved line is the moving object, and the opposite side is the background. The curved line traverses $v_{31}$, $v_{42}$, $v_{52}$ and $v_{62}$. Since the motion along with the object edge differs, there exist high residual energies around the curved line. Using the MV classification approach of the invention, high residual areas are identified as blocks $v_{31}$, $v_{41}$, $v_{42}$, $v_{52}$ and $v_{62}$. In FIG. 3B, the merging step groups the left two MBs as a connection unit, and a proper motion is assigned using Eqn. (4). FIG. 3B demonstrates the updated MVF$_1$ and modified MVs are the MBs on the left side including $v_{m1}$ and $v_{m2}$. FIG. 3B represents a dominant MV for this moving object. Subsequent steps of MV re-classification and motion refinement obtain finer details of the motion and correct MVs that would be unreliable for the finer details of the motion. In FIG. 3C, the result of the reclassification of step 50 is shown. Based upon the ABPD, now $v_{31}$, $v_{32}$ and $v_{42}$ are deemed unreliable and motion vector refinement of step 60 is applied to the lower left MB. FIG. 3D demonstrates that $v_{32}$ and $v_{42}$ are modified after MV refinement step 60 and $v_{31}$ remains the same since neighboring MVs cannot better represent its original MV. Thus, as seen, the correction unit size has varied through the method.

After the MV selection stage 30, the MVs in each merged group are updated with a single MV that minimizes the bidirectional prediction difference in step 40 of FIG. 1. This new MV for each merged group is considered as a "global" MV in that merged group. However, there may still be smaller areas inside the MBs where this new MV cannot represent their motions. Since the residual energy can no longer provide information about this new MV, step 40 uses bidirectional prediction difference (BPD) to re-classify those MVs that are found in the MV selection stage, $MVF^1$. In addition, possibly unreliable MVs are revisited here and their BPD is checked to see if they are truly reliable. For those MVs that are reliable, they will still remain reliable in this stage. Therefore, in this step, those MVs that are unreliable ($L_1$) and possibly reliable ($L_2$) in the first place are addressed.

In step 50, the reliability re-classification that addresses the unreliable ($L_1$) and possibly reliable ($L_2$) MVs. There are already different weights on luminance and chroma, which were assigned while calculating residual energy in the previous classification and motion selection, so here it is possible to simply sum up difference error based on a 8×8 block size using the same criteria to obtain the new energy distribution BPD(m; n).

$$BPD_{m,n} = BPD_{m,n}^Y + \alpha \cdot (BPD_{m,n}^{Cb} + BPD_{m,n}^{Cr}). \quad (5)$$

where $BPD^Y(m; n), BPD^{Cb}(m; n)$, and $BPD^{Cr}(m; n)$ are the sum of bidirectional prediction difference for Y, Cb, and Cr components of block $b_{m,n}$ using the updated MV $v^*_b$, respectively. The luminance and chrominance information in BPD calculation in Eqn. (5) and use the same weighting factor as in Eqn. (2).

If the $BPD_{m;n}$ is higher than a threshold $\epsilon_3$, then the MV $v^*_b$ will be classified as unreliable and put in $L_1$. Those MVs with $BPD_{m;n}$ lower than $\epsilon_3$ will be classified as reliable in $L_3$. The classification can be written as $$MVRM(m, n) = \begin{cases} L_1, & \text{if } BPD(m, n) \geq \epsilon_3, \\ L_3, & \text{if } BPD(m, n) < \epsilon_3. \end{cases} \quad (6)$$

Preferred pseudo code for the MV re-classification is presented.

```
output_MVF = zero array;
do
{
    Finish_Flag = (output_MVF == input_MVF) ? TRUE : FLASE;
    output_MVF = input_MVF;
    FOR (all MB(i,j))
    {
        IF (MBMM(i,j) != 0)
        {
            Merged_Group(i,j) = MB(i,j) + neighboring MBs with the
            same index;
            new_MV =
            MV with min(ABPD(adjacent MVs and MVs in
            Merged_Group(i,j))):
            IF (ABPD(new_MV) <ε₂ || Finish_Flag == TRUE)
            {
                output_MVF(Merged_Group(i,j)) = new_MV;
                MBMM(Merged_Group(i,j)) = 0;
                Merged_Blks(i,j) = 8x8 partitions of
                Merged_Group(i,j);
                MVRM (Merged_Blks(i,j)) = ABPD(new MV) < ε₃ ?
                L₃ : L₁;
            }
        }
    }
}WHILE (Finish_Flag == FALSE)
```

With the re-classification of step 50, there remain only two classifications as the possibly reliable MV ($L_2$) classification is eliminated with the re-classification. After the re-classification of step 50, all the $L_2$ MVs are classified as unreliable ($L_1$) or reliable ($L_3$). Possibly reliable MVs are re-classified in this stage, while MVs determined previously to be reliable are maintained.

Simulations have shown that the difference between the forward and backward predictions usually has larger scale values than the received prediction error. As a result, the method can use an increased threshold value to find improper MVs in the re-classification step 50. The updated classification map, MVRM', is the reference map used in the MV refinement step 60. Due to the way motion refinement works, the scale of threshold value is not particularly sensitive to its performance but the refinement should ensure that all visible artifacts can be detected effectively.

After the motion selection process, a MB that sits on a high residual energy area will only have one single motion vector that presents major motion. As the MB consists of multiple motion, regions having different motion can be easily detected by high difference error between forward and backward predictions in step 40. Therefore, these unsuitable motion vectors can then be identified and re-classified in step 50 in the MVRM'. Remaining unreliable MVs can be corrected in the refinement step 60. In the refinement step 60, unreliable MVs in $L_1$, can be corrected using a reliability and similarity constrained median filter as follows:

$$v^*_{m,n} = \operatorname*{argmin}_{v \in S} \sum_{i=m-1}^{m+1} \sum_{j=n-1}^{n+1} w_{i,j} \|v - v_{i,j}\|, \quad (7)$$

where $$w_{i,j} = \begin{cases} 0, & \text{if } MVRM(i, j) = L_1 \text{ or } \sigma_\theta > \epsilon_1, \\ 1, & \text{if } MVRM(i, j) = L_3. \end{cases}$$

S contains the neighboring MVs centered at $v_{m;n}$, and $\sigma_\theta$ denotes the vector angle variance. The angle variance is used for measuring the similarity of the candidate motion vectors and the original motion vector, which can be obtained by taking the inner product of the two vectors as follows:

$$d_{i,j} = 1 - \frac{v_{m,n} \cdot v_{i,j}}{|v_{m,n}||v_{i,j}|} = 1 - \cos\theta \quad (8)$$

Two MVs are considered to be similar if the angle variance is below a the threshold. An example suitable threshold determined from experiments for $\epsilon_4$ is 0.15. Since those 8×8 blocks are known to have different motion or belong to another object, this step should avoid getting the same or similar MV. Hence, the vector median filter sorts the candidate MVs that have passed the similarity check and chooses the most probable one. Preferred pseudocode for the refinement step is provided:

```
output_MVF = input_MVF;
Finish_Flag = FALSE;
WHILE (Finish_Flag == FALSE)
{
    FOR (all MB(i,j) )
    {
        IF (MBRM(i,j) != 0)
        {
            new_MV = RSCVMF(adjacent MVs);
            IF (ABPD(new_MV) < ABPD(input_MVF(i,j)))
            {
                output_MVF(i,j) = new_MV;
            }
        }
    }
    Finish_Flag = (output_MVF == input_MVF) ? TRUE : FLASE:
    Input_MVF = output_MVF;
}
```

When a significant number of motion vectors, e.g., more than half of motion vectors of a MB, have high difference error energy, motion refinement will not be applied. Motion selection is supposed to select a major motion for this current MB, so in such a case it is reasonable to presume that the resultant high difference error is not caused by the motion boundary but is caused by other issues, such as luminance or chrominance changes. In such the case, performing motion vector refinement may break structures that have been well established by motion selection. Prior to the MV update in the refinement step, an energy check is performed on the bidirectional difference error of the candidate MV whose error energy must be smaller than the original one. If the candidate MV, $v^*_b$, fails to pass the energy check, its unreliability level will not be updated, and the method will try to correct it in the next iteration if a different MV can be found with an updated MVF. A reasonable iteration number for the motion refinement step 60 is 2. With two iterations, it is possible that MVs with reliability level $L_1$ remain incorrect after the refinement.

Depending on how structure information distributes on a 8×8 block, the energy check decides if the candidate MV can represent the major motion. If not, the refinement step is skipped and the method further modifies this unreliable MV with a finer block size 4×4 in the motion vector smoothing process of step 70. in the example provided in FIG. 3, it can be seen that from FIG. 3C to FIG. 3D, the unreliable MVs of 8×8 identified by the re-classification process are effectively corrected using the refinement step 60. With the similarity constraint, the method is prevented from using identical and similar MVs to correct $v_{32}$ and $v_{42}$. As to $v_{31}$, the reason why it remains unchanged is that the candidate MV will fail in the energy check because its original MV can better represent the major motion. As seen in FIG. 3, there can still be high bidirectional differences in finer scale areas, which can cause some blockiness artifact. MV smoothing in step 70 can reduce such blockiness.

In Step 70, to reduce the blocking effect, a method described in "Smooth motion vector resampling for standard compatible video post-processing," Proc. Asilomar Conf. Signals, Systems and Computers (2004) is used in a preferred embodiment to create a motion field with a finer scale. This method determines smoothness in north, south, east, west, diagonal and center directions, and then determines an optimal solution that minimizes a smoothness measure. In the smoothing, each 8×8 block can be further broken into four 4×4 sub-blocks and the MVs of these four sub-blocks can be obtained simultaneously by minimizing a smoothness measure which is defined in the following.

$$\Psi = \Psi_N + \Psi_S + \Psi_E + \Psi_W + \Psi_D + \Psi_C \tag{9}$$

The subscripts of $\Psi$, {N, S, E, W, D, C}, individually represents the smoothness measures between the centered MVs and their adjacent MVs in north, south, east, west, diagonal and center directions. For example, the smoothness measure of these four MVs in their north direction is defined as $$\Psi_N = \|v_{m,n}^1 - v_{m,n-}^3\|^2 + \|v_{m,n}^2 - v_{m,n-1}^4\|^2 + \|v_{m,n}^3 - v_{m,n}^1\|^2 + \|v_{m,n}^4 - v_{m,n}^2\|^2 \tag{10}$$

In the equation, the MV $v_{m;n}$ in the block $b_{m;n}$ is broken into four sub-blocks $b^i_{m;n}$; i=1; 2; 3; 4 in scan order, with initial MV $vi_{m;n} = v_{m;n}$. The smoothness measures for all other directions can be similarly derived. The optimal solution is obtained by combining different direction smoothness measures into a matrix form and minimizing $\Psi$ in Equation (9) with respect to the four MVs.

This resampling (smoothing) approach is only used on those MVs with reliability levels, $L_1$ and $L_2$, because they are the major cause of visual artifacts in the frame interpolation. Corrected MVs in $MVF^3$ are used in the smoothing process to produce a denser MVF $MVF^4$ during the smoothing process, which is unlike the method in "Smooth motion vector resampling for standard compatible video post-processing," Proc. Asilomar Conf. Signals, Systems and Computers (2004), as that method uses the original received MVF is $MVF^0$.

Step 80 conducts motion adaptive frame interpolation with a unidirectional decision on the frame boundary. MPEG4 and H.263+, for example, allow motion estimation to search out of frame boundary by extending the boundary pixel values for better coding efficiency. However, for frame interpolation, it is difficult to get good interpolation results by using bidirectional interpolation in Equation (1). For example, for MBs on the first row, if the MV in vertical direction, $v_y$, is less than zero, it implies that a new object appears in the next frame and the previous frame only has part of the content. Simply averaging the forward and backward predictions will cause visual artifacts. Hence, for those MBs on the frame boundary, the method preferably uses unidirectional interpolation based on the directions of their MVs. That is, the weights of forward and backward predictions are adaptively change based on the MVs and can be summarized as in Table I

TABLE I

WEIGHT VALUES FOR FORWARD AND BACKWARD MOTION COMPENSATION ON FRAME BOUNDARY.

| m = 1 | $w_{t-1}$ | $w_{t+1}$ | n = 1 | $w_{t-1}$ | $w_{t+1}$ |
|---|---|---|---|---|---|
| $v_y \le 0$ | 0 | 1 | $v_y \le 0$ | 0 | 1 |
| $v_y > 0$ | 1 | 0 | $v_y > 0$ | 1 | 0 |
| m = M | $w_{t-1}$ | $w_{t+1}$ | n = N | $w_{t-1}$ | $w_{t+1}$ |
| $v_x \le 0$ | 1 | 0 | $v_x \le 0$ | 1 | 0 |
| $v_x > 0$ | 0 | 1 | $v_x > 0$ | 0 | 1 |

In additional embodiments of the invention, MV correlation is used in the classification process to find unreliable MVs that can't be discovered by the classification based solely upon residual energy. Correlation can also be used during the MB merging step, the MV selection and the MV interpolation. With received MVs for the bidirectional MCFI scheme, MV correlation, residual energy, coding types, and the property of co-located MVs are used to classify the received MVF. To detect occlusion areas, an iterative, multi-stage, the MV processing scheme of additional embodiments employs different levels of threshold values of averaged bidirectional prediction difference. During the correlation-based MV selection process, the MV correlation between neighboring MVs and the MV correlation between the merged group and its surrounding MVs are explicitly considered. Different sigmoidal functions are used for MV interpolation based on MV correlation and bidirectional prediction difference. Additionally, propagating the surrounding correct MVs can be conducted using vector median filter into the occlusion areas. For the occlusion areas, an adaptive interpolation scheme by observing the MV direction and MV magnitude can be used.

Figure 4:
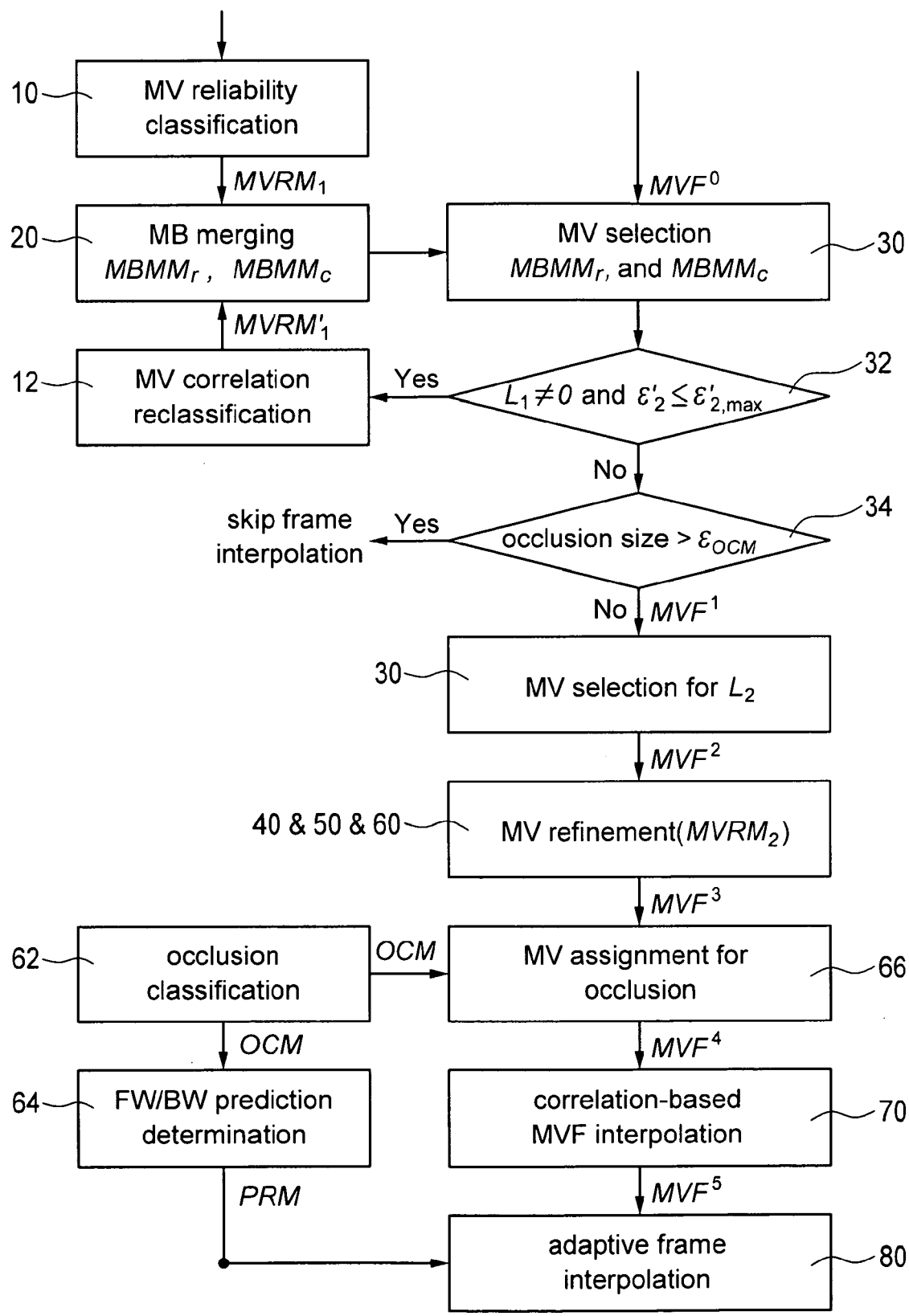
FIG. 4 illustrates the improved preferred embodiment method of the invention for hierarchical motion vector processing.

FIG. 4 shows an additional embodiment method that uses correlation to aid MV selection, merging and interpolation. In FIG. 4, similar steps are labeled with reference numerals from FIG. 1, and additional steps are assigned new reference numerals. There is MV classification step 10 as in FIG. 1, but irregular MVs with low residual energy can still occur, depending on how the motion estimation is performed at the encoder. This is because the encoder usually takes coding difficulties, such as prediction errors and the difference between the estimated MV and its neighboring casual MVs, as the cost function. As such, once an irregular MV has been estimated previously, it may affect the MV decision for the following blocks, especially in an area where repeated pattern occurs. That is, irregular MVs may appear in a cluster.

While most of the visual artifacts are caused by MVs with high residual energies, MVs with low correlations and areas where no MVs are available can also cause artifacts. The additional embodiments refine classification to account for unreliable MVs that might not be revealed through residual energy.

In these embodiments those MVs with low residual energies are analyzed further based upon correlation in step 12. The residual energy classification map is used along with a correlation map generated in the correlation classification of step 12 to control the merging of step 20. The residual energy can be calculated through the absolute value of the reconstructed prediction errors:

To detect irregular MVs that have low residual energy step 12, calculates the correlation index of each MV to all its available adjacent MVs. Here, the correlation index can be defined using Euclidian distance between $v_{m,n}$ and its adjacent MVs. First define the motion magnitude distance as follows:

$$d(m,n,i,j) = \|v_{m,n} - v_{m+i,n+j}\|_2, \quad (11)$$

where $v_{m+i, n+j}$ are the surrounding available MVs, i.e., inter-MVs. According to observation, d is usually higher than other areas if the local movement is relatively large. Therefore, to reduce the sensitivity from the motion magnitude values, the correlation index is defined as the magnitude variance in the local neighborhood:

$$c_{m,n} = \frac{\frac{1}{8}\sum_{i=-1}^{1}\sum_{j=-1}^{1} d_{(m,n,i,j)}}{\frac{1}{9}\sum_{i=-1}^{1}\sum_{j=-1}^{1} \|v_{m+i,n+j}\|_2} \quad (12)$$

As the averaged magnitude distance increases, $C_{m,n}$ between the current MV and the neighboring MVs increases as well. To determine if the remaining MVs are unreliable or possibly unreliable, compare $C_{m,n}$ with the averaged MV correlation index in this neighborhood, which can be written in the following:

$$C_{m,n}^{avg} = \frac{1}{9}\sum_{i=-1}^{1}\sum_{j=-1}^{1} C_{m+i,n+j} \quad (13)$$

If $C_{m,n}$ is greater than $C_{m,n}^{avg}$ and the motion distance is greater than half of the averaged magnitude, $v_{m,n}$ will be considered as an unreliable MV. After the residual energy and the correlation index classifications, if there are still MVs that are not classified yet, we place them into the possibly reliability set $L_2$. The MV reliability map can therefore be created as follows:

$$MVRM_1(m, n) = \begin{cases} L_1, & \text{if } E_{m,n} \geq \varepsilon_1 \text{ or } b_{m,n} \text{ is intra-coded,} \\ L_3, & \text{if } C_{m,n} > C_{m,n}^{avg} \text{ and} \\ L_2, & \text{otherwise.} \end{cases} \quad (14)$$

A modified merging step 20 accounts for the fact that MVs of $L_1$ and $L_3$ can be identified due to different reasons, and they should not be merged together. Based on the MV analysis, two merging maps $MBMM_r$ and $MBMM_c$ are created for the MV processing stage so that adjacent unreliable MVs can be corrected together and yield a single best MV. The merging process is performed on a MB basis, and all MBs that contain unreliable MVs will be examined in a raster scan order. The residual MB merging map, $MBMM_r$, is first created based on residual energy distribution. For unreliable MVs in $L_3$, a separate correlation MB merging map, $MBMM_C$ is created. If a MB containing unreliable MVs is found in $L_3$, adjacent MBs that have not yet been merged will be checked whether they have similar MVs to these unreliable MVs. If this is the case, these MBs will be merged together. If there are no similar MVs in the neighborhood, this MB will remain as a single block and this unreliable MV is regarded as an isolated MV. MVs are considered similar if their angular distance, $d_\theta$, and Euclidian distance, d, are less than predefined thresholds, $\epsilon_\theta$, and $\epsilon_m$, respectively. Here, the angular distances $d_\theta$ can be represented as:

$$d_\theta(m, n, i, j) = 1 - \frac{v_{m,n} \cdot v_{i,j}}{|v_{m,n}||v_{i,j}|} = 1 - \cos\theta, \quad (15)$$

where θ is the angle difference between $v_{i,j}$ and $v_{m,n}$. The distance d can be obtained using Equation (13). 32×32 is selected as the maximum block size for the merging process. In both merging maps, each merged group can be assigned a unique index number to the MBs belonging to the same group.

According to the residual merging map ($MBMM_r$), the correlation merging map ($MBMM_c$), and the received MVF, the best MV can be selected for each merged group from its own and neighboring MVs by minimizing the absolute bidirectional prediction difference (ABPD). This prediction difference process is conducted along with an iterative threshold mechanism to decide when the process should be terminated. Initially, only the MV whose ABPD is less than the predefined threshold value, $\epsilon_2$, will be selected in step 32 to correct unreliable MVs within each merged group. If this is not the case, these unreliable MVs will remain the same and wait for the future correction. To trace the MV correction status, during each MV selection pass, only the index numbers for the corrected MVs and their associated merged MBs will be cleared from the merging maps and the MV reliability map. If there are still non-zero indices in the updated MBMM$_r$ and the MVF status is no longer changed due to the limitation on the threshold value, $\epsilon_2$ will be increased for the next MV correction pass. Since an image may consist of various contents such as objects with constant intensity (i.e. low ABPD value) and sharp edges (i.e. high ABPD values), by adaptively adjusting threshold values, the method can gradually choose the best motion for each merged group. In this way, not only can better motion with lower ABPD value propagate to the neighborhood of unreliable MVs during the MV selection process, but unreliable MVs can be corrected according to their degree of MV reliability, i.e. ABPD values.

For the subsequent MV selection iteration, since the correlation distribution has changed, the irregular MVs that are classified in $L_3$ previously can be detected again. This is because these low-correlated MVs usually appear in a cluster and the initially detected unreliable MVs are probably located on the boundary where irregular MVs start to occur. To correct these unreliable MVs, the method recursively examines the updated MV correlation distribution and modifies the correlation merging map, MBMM$_c$, accordingly. The subsequent MV correlation classification will skip the unreliable MVs of $L_1$ that are not corrected in the previous pass. This is because their merging status is determined by the residual energy distribution rather than the motion correlation. That is, for the unreliable MVs in $L_1$, if their reliability level is not changed, their merging status will be the same.

The MV selection process 30 stops whenever the merged groups in MBMM$_r$ are all assigned the single best motion or $\epsilon_2$ is greater than a predefined maximum threshold value, $\epsilon_{2,max}$. This maximum threshold value should be designed to find appropriate motion for all merged groups, so if there are merged groups of MBMM$_r$ that are not assigned any motion due to high ABPD values, they are considered to be occlusions. Their MVF is left blank, since forcing them to have new MVs using a very high $\epsilon_2$ value still cannot obtain reliable MVs. For these occlusion areas, a parallel occlusion classification can be undertaken for the further processing. The reason why the iteration process is only defined based on MBMM$_r$ is that most of occlusions occur in high residual energy and intra-coded areas. A fixed $\epsilon_2$, value of 45 was obtained from experimental analysis. Therefore, for the unreliable MVs in $L_3$, a fixed $\epsilon^c_2$ (45) is suitable for the MV selection process. For unreliable MVs in $L_1$, start the $\epsilon_2^r$ value from 30 with the step size of 15, and set the $\epsilon^r_{2,max}$ value to be 60 for all test sequences.

To ensure the remaining unchecked MVs, i.e. possibly unreliable MVs, are truly reliable, the MV selection process is applied with fixed block size of 16×16 to examine if their MVs do have smaller ABPD than others. Since the MVF is corrected and regular at this stage, even with small fixed block size, the possibility to select inaccurate MVs for the MVs in $L_2$ is relatively low. As the MV selection always prefers the major motion for each merged group, once the selected motion cannot well represent the details such as the motion boundary, the areas with different motion usually have higher ABPD values than other areas. Therefore, it is possible to classify the new obtained MVF based on the smaller 8×8 block size using the ABPD energy distribution, during the reclassification of step 40 and the refinement of step 50. After the new identified unreliable MVs in MVRM$_2$ are further refined using surrounding dissimilar MVs, to minimize the blockiness artifacts and keep the object edge sharp at the same time, resample the 8×8 MVF into finer 4×4 MVF with consideration on both MV correlation and ABPD distribution.

The motion vector selection can encounter those unreliable MVs in $L_3$ that are identified due to irregular MV distribution. Depending on what the scene is composed of and how the MV estimation is performed at the encoder, the selected MVs may tend to distribute randomly if the method merely considers the minimum ABPD. For this reason, both minimum ABPD and MV correlation should be considered for merged groups of MBMM$_c$. That is, choose MVs that have minimum ABPD among adjacent MVs that have higher correlations than the original MV. Hence, the candidate set, S, can be re-written as follows:

$$S = \begin{cases} v_{i,j}, & \text{if } C(v_{i,j}) < C(v_{m,n}) \\ 0, & \text{otherwise.} \end{cases} \quad (16)$$

The correlation index, C(v), is calculated based on the boundary MVs of the merged group and its neighboring MVs. That is, each merged group is considered as a unit block, and only the motion distances between the merged group and its neighboring available MVs are used to select MV candidates. This is because the MVs inside the merged group are similar and directly calculating the motion distance may not truly reflect the motion correlation for the merged group. If the correlation index of $v_{i,j}$ is less than the original correlation index, $v_{m,n}$, $v_{i,j}$ will then be considered as MV candidates for S. Once the best MV exists, assign it to all MBs within the merged group. If not, it means that there are no other MVs having higher correlation and better representing the local motion than the original MVs. In such case, these unreliable MVs might belong to the area where the motion starts to differ or the different moving object. Therefore, skip this MV selection process and keep the MVs and the MBMM$_c$ unchanged.

The MV selection processes for both types of unreliable MVs are preferably performed in the same pass. Hence, if the MV assignment for the merged groups of MBMM$_r$ is not completed due to the threshold mechanism, MBMM$_c$ will be updated according to the current MV correlation distribution for the next pass. Therefore, the updated MV map can be created as follows:

$$MVRM'_1(m, n) = \begin{cases} L_1, & \text{if } MVRM_1(m, n) = L_1, \\ L_3, & \text{if } C'_{m,n} > C^{avg'}_{m,n} \text{ and} \\ L_2, & \text{otherwise.} \end{cases} \quad (17)$$

If the unreliable MVs of $L_1$ are not correct yet, they will be still in $L_1$ level for the next correction. Based on the updated correlation indices and averaged correlation indices, $C_{m,n}'$ and $C_{m,n}^{avg'}$, the method can discover more low-correlated unreliable MVs that have not been detected in the first place. According to the updated MVRM$_1$', the corresponding MBMM$_c$ can be recreated as well. For MBMM$_r$, the merging status will be the same except the blocks whose MVs have been corrected. In the end of each pass, check if unreliable MVs in MBMM$_r$ are all corrected, if the threshold value is still within the predefined range, and if the occlusion caused by unreliable MVs of $L_1$ has reasonable size, to decide when the MV selection should be completed. Due to the consideration on MV correlation, the unreliable motion in the direct interpolated result can be corrected.

Although the MV selection process of FIG. 4 needs to recursively calculate ABPD for each merged group, the MV candidates are actually almost the same to the MVs in the previous pass except the new MVs that have propagated to the neighborhood. To reduce the computation load, two tables can be created to save the MVs that have occurred before and their corresponding ABPD values. In this way, the computation complexity required for unreliable MVs in $L_1$ is reduced. For identified low-correlated MVs, the same approach can be used to avoid the repeated calculation of ABPD values.

MV Averaging to reduce the blockiness artifacts can be conducted with MV correlation, which can further resample the MVF from one MV with 8×8 block size, $v_{m,n}$, into four MVs, $\{v_{m,n}^1, v_{m,n}^2, v_{m,n}^3, v_{m,n}^4\}$. In general, the vector averaging filter can always provide desirable MV smoothing effect for reducing blockiness artifacts. However, the visual quality of the motion sensitive areas such as sharp object edges and striped textures are often distorted by the MV smoothing process. This is because in these areas, unpleasant artifacts can easily show up even when the motion is only modified slightly. Therefore, the motion smoothing should be performed with consideration on the motion correlation and the scene contents so that we can reduce the MV smoothing impact from neighboring MVs on these motion sensitive areas. An adaptively weighted vector averaging process addresses these issues.

$$v_{m,n}^k = \left[ \frac{\sum_{i,j} f(d_{m,n}^k, e_{m,n}^k) v_x}{\sum_{i,j} f(d_{m,n}^k, e_{m,n}^k)}, \frac{\sum_{i,j} f(d_{m,n}^k, e_{m,n}^k) v_y}{\sum_{i,j} f(d_{m,n}^k, e_{m,n}^k)} \right], \quad (18)$$

where $v_x$ and $v_y$ are horizontal and vertical components of $v_{i,j}$, respectively. Here, $v_{m,n}$ and $ABPD_{m,n}$ are partitioned into four sub-blocks, $v_{m,n}^k$ and $e_{m,n}^k$, individually. $e_{m,n}^k$, which is the same as $ABPD_{m,n}$ is used to roughly measure the interpolation difficulty. That is, if the moving object is not exactly the same in two consecutive decoded frames, the areas where object is distorted should have high ABPD values. In such case, motion smoothing can help to minimize the difference between block boundaries. When the scene consists of simple textures or the scenes between two decoded frames are the same, the weights of adjacent MVs should be decreased since the scene content might be very sensitive to MV adjustment. $d_{m,n}^k$ is the corresponding Euclidian distance between $v_{m,n}^k$ and adjacent MVs, $v_{i,j}$. If the distance is large, which usually happens when motion has sudden change, the corresponding weights should be reduced to reserve sharp object edges. A suitable function $f$ function is an inverse mapping function for both vector distance and ABPD energy.

Figure 5:
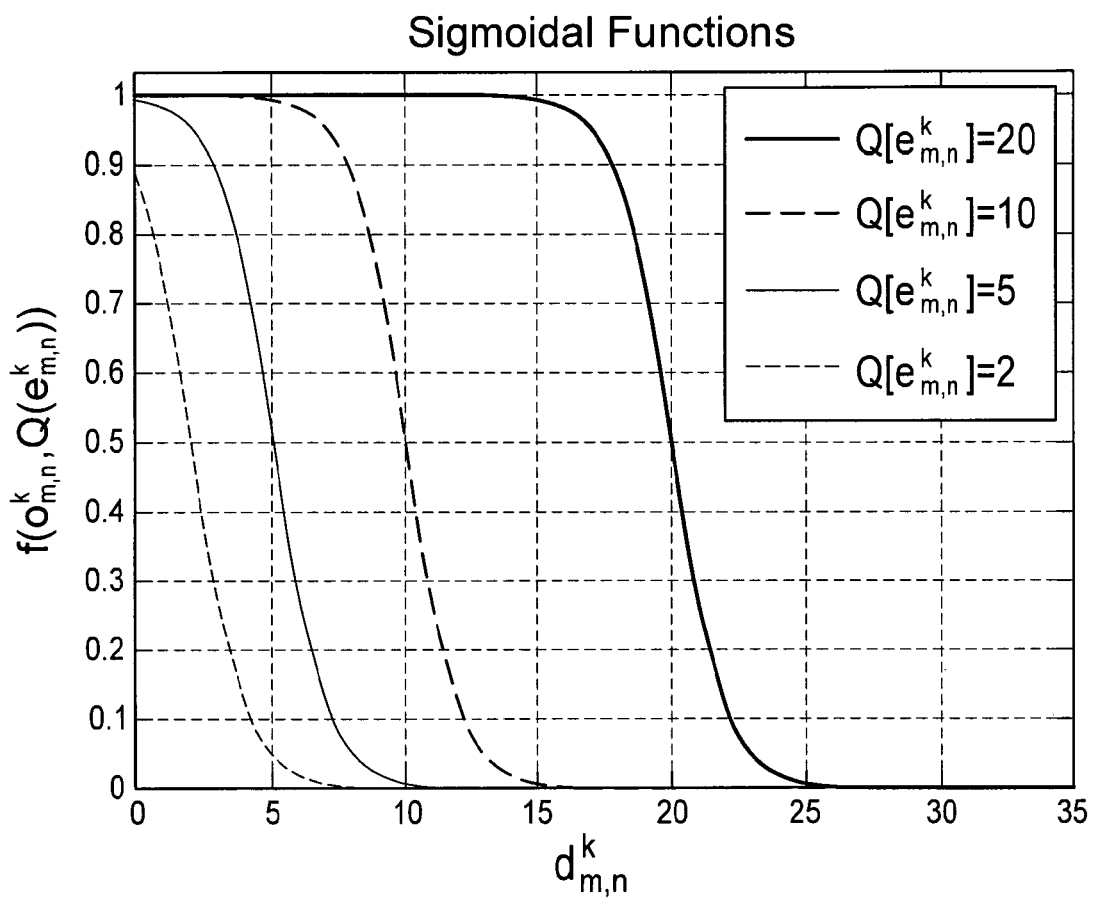
FIG. 5 illustrates sigmoidal functions used in an example experimental simulation of the FIG. 4 preferred embodiment method.

Initially, assign $v_{m,n}$ to $v_{m,n}^k$, k=1, 2, 3, 4. Then, set the weight for the centered MV to be one and the weights of neighboring $v_{m,n}^k$ can be updated individually using the vector averaging calculation. A sigmoidally shaped function is selected with two input parameters, $d_{m,n}^k$ and to $e_{m,n}^k$, to adaptively adjust the weights for MV averaging, Thus, the inverse mapping function can be then written as follows:

$$f(d_{m,n}^k, Q(e_{m,n}^k)) = \frac{1}{1 + e^{(d_{m,n}^k - Q(e_{m,n}^k))}} \quad (19)$$

where $d_{m,n}^k$ is the corresponding distance between $v_{m,n}^k$ and surrounding MVs, and $Q(e_{m,n}^k)$ is the step function of the ABPD energy. The sigmoidal function defined opens to the right, so as $d_{m,n}^k$ increases, the weight value decreases accordingly. $Q(e_{m,n}^k)$ is used to decide the center of the sigmoidal function in which the weight value reduces to half. Based on the previous discussion, shift the sigmoidal center rightward when the ABPD energy is large. Similarly, as ABPD decreases, the center will be moved leftward until $ABPD_{m,n}=0$ and only same MVs can have non-zero weights, i.e. 1. FIG. 5 shows four different sigmoidal functions for MV averaging that were used in experimental simulations. As observed, MVs whose distances are similar within a certain range can have same or similar impacts during vector averaging. Likewise, once the distance goes beyond a certain range, its weight can be reduced immediately The sigmoidal functions with four different $Q(e_{m,n}^k)$ values can be saved as sampled values as look-up tables. Hence, without calculating the actual exponential function, the proposed MVF interpolation method can simply obtain corresponding weights from the table according to the corresponding $d_{m,n}^k$ value.

The method can conduct adaptive frame interpolation for occlusion areas as no MVs are assigned to occlusion areas since the motion is only reliable when appropriate predictions can be found from both forward and backward frames. If the unreliable MVs in $MBMM_r$ have not been corrected until the MV selection process terminates, the MBs that still have non-zero indices will be regarded as occlusions. In addition, the MBs whose MVs still cannot be corrected during the MV refinement stage are also considered as occlusions. To assist the subsequent frame interpolation for the occlusion areas, an occlusion map (OCM) is created to indicate the occlusion position and range as follows:

$$OCM_{m,n} = \begin{cases} 1, & \text{if } MBMM_r(m, n) \neq 0, \\ 2, & MB \text{ that has } ABPD > \varepsilon_3, \\ 0, & \text{otherwise.} \end{cases} \quad (20)$$

An example preferred value for $\varepsilon_3$ is 2000. In OCM, the first type of occlusion often has larger size and the resulting artifacts are more visible, such as deformed structures and the occurrence of the new objects. The second type of occlusion is often the motion boundary or the surrounding MBs of type 1 occlusions. The method calculates the occlusion size to determine whether the occlusion areas can be recovered. If the occlusion region is larger than a predefined threshold, $\varepsilon_{OCM}$, step 34 terminates the interpolation process and repeats the current decoded frame.

Excluding the appearance of new large objects and large scale object distortion, most occlusion cases are commonly caused by existing moving objects. These occlusions usually occur around the object contour or the frame boundary, so their sizes are often within a reasonable range and they can be recovered by adaptively selecting forward or backward prediction. By analyzing the motion distribution around the occlusion area, a prediction reference map can be further created to determine whether forward prediction or backward prediction is better for occlusion areas.

The bidirectional interpolation is modified to account for occlusions as follows:

$$f_t(i, j) = w_f \cdot f_{t-1}\left(i + \frac{1}{2}v_x, j + \frac{1}{2}v_y\right) + w_b \cdot f_{t+1}\left(i - \frac{1}{2}v_x, j - \frac{1}{2}v_y\right), \quad (21)$$

where, $w_f$ and $w_b$ are the weights for forward and backward predictions, respectively. For the identified occlusion areas in OCM, $w_f$ and $w_b$ are adaptively adjusted to obtain the best visual experience.

The corrected MVF can provide information about the motion distribution and analysis can show how these movements cause the occlusion. The prediction selection can be differentiated by examining the MV directions and MV magnitudes and a block-based prediction reference map (PRM) can be to derived:

$$PRM_{m,n} = \begin{cases} w_f = \frac{1}{2}, w_b = \frac{1}{2}, & \text{if } OCM_{m,n} = 0, \\ w_f = 1, w_b = 0, & \text{if } b_{m,n} \text{ of } f_{t-1} \text{ is pointed by } MVs, \\ w_f = 0, w_b = 1, & \text{otherwise.} \end{cases} \quad (22)$$

Prediction classification is conducted using OCM according to equation (22) in step. The method examines the neighboring MVs for each occlusion area in the forward direction. If colocated blocks of the occlusion region are not pointed by any correct MVs, this occlusion region will only have backward predictions for the interpolation. Otherwise, assign forward predictions in step 64. Adjacent occlusion blocks are considered as the same occlusion area. The same criteria can also be used to explain the occlusion occurrence on the frame boundary. If a frame boundary MB does not have any MVs pointing to it, this means that it is the initial block of the whole movement. In such case, the backward prediction should be used. Since the present interpolation scheme cause three different prediction modes for the interpolated frame, to make the pixel values do not change abruptly on the boundary between forward and backward predictions, low-pass filtering can be applied on the boundary pixels afterward.

The type I occlusion regions are not assigned motion until the object major motion and detailed motions are determined. Different from some of the conventional assumptions that only assume two motions around the occlusion area, there usually are various movements. As a result, it is very difficult to tell which movements the occlusion should have once the occlusion region is large. In order to avoid the occlusion motion distribution from being dominated by either motion, the method spirally assigns MVs to occlusion regions in step 66. Along the spiral trace, start from the left-top and clockwise assign the MV to each occlusion using VMF based the 8×8 block size. If there are no MVs available for VMF processing, check this block in the future iteration. The assignment stops when all occlusion sub-blocks have MVs. In this way, once the occlusion size is large, the method can still ensure these interpolated blocks can follow the neighboring movement After a MVF has been further smoothed and interpolated in step 70 using the weighted MV averaging filter, the final corresponding MVF and the prediction map will be used for the frame interpolation in step 80. This MV processing does not include the type 2 occlusions since they already have motions. The reason why these MVs still have high ABPD energies after the MV refinement is that they may be located on the edges of the occlusion area. Simulations show that the interpolated result using the adaptive interpolation scheme looks much better than the general bidirectional scheme. Occlusion artifacts around troublesome areas are removed.

The modified methods use MV correlation to discover unreliable MVs that cannot be detected using received residual energies. Considering those similar irregular MVs should belong to the same object, the method creates a MB merging map for the correlation based MV selection process. In this way, more pixels can be referenced for the MV selection so that correct motion can be found even in smooth areas or repeat pattern areas. In addition, to solve the occlusion issues, the method corrects unreliable MVs recursively based on different levels of the ABPD energy so the occlusion areas or the deformed objects can be discovered effectively. These identified occlusion areas are further analyzed and assigned appropriate MVs from neighboring corrected MVs. After the MVF has been determined, a prediction reference map created to denote which interpolation modes for the current occlusion should be employed. As a result, the method can remove most of the ghost artifacts and obtain clearer object contours.

Simulations have demonstrated that methods of the invention performs well compared to other methods, and successfully refines received MVs by gradually detecting failed areas of the interpolated frame. The method uses knowledge of residual and bidirectional difference error distributions and their actual meaning reflecting to human visual experience, and can effectively detect places where artifacts happen provide further correction to reduce such visual artifacts. Simulations show that methods of the invention are very robust in eliminating artifacts for various video sequences. Moreover, methods of the invention should fulfill low-complexity requirements that are demanded by many video decoders.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for hierarchical motion vector processing implemented by code stored on a non-transient computer readable medium, comprising:
    Receiving image data including a motion vector field for a block in an image and residual energy concerning the image block;
    developing determining reliability levels of blocks in the image data using the residual energy according to residual energy levels;
    developing a merging map based upon the residual energy distribution and vector reliability classification and merging blocks based upon the merging map in accordance with the reliability levels of blocks determined in said step of determining;
    selecting single motion vectors for each merged group of blocks from its own and neighboring block reliable motion vectors;
    determining the bi-direction difference between the reference frame and the decoded frame for the selected motion vectors;
    iteratively assigning motion vectors of blocks merged in said step of merging by minimizing bi-directional prediction difference on successively smaller merged blocks, wherein the iteratively assigning includes re-classifying motion vector reliability using the bi-directional difference and refining motion vectors between the reference frame and current decoded frame using the re-classified reliability and the bi-directional difference; and
    smoothing motion vectors.

2. The method of claim 1, wherein the residual energy is calculated using luminance information.

3. The method of claim 2, wherein said step of developing initial classifies motion vectors as reliable, possibly reliable and unreliable by comparing the residual energy to a threshold and
    classifying motion vectors of intra-coded blocks as unreliable;

classifying motion vectors of blocks having a residual energy meeting or exceeding the threshold as unreliable;

classifying the motion vector of any block not otherwise determined unreliable as possibly reliable if that block has an block with an unreliable motion vector in its macroblock or an adjacent macroblock; and otherwise, classifying blocks as reliable.

4. The method of claim 3, wherein said step of merging blocks merges unreliable motion vectors.

5. The method of claim 1, wherein said refining and smoothing steps use successively smaller blocks than said step of developing a reliability classification.

6. The method of claim 1, wherein said step of developing a reliability classification further develops a motion vector correlation classification and wherein said step of developing a merging map uses both the vector reliability classification and the motion vector correlation classification to develop the merging map.

7. The method of claim 1, further comprising a step of classifying occlusion regions after said step of refining, wherein said step of classifying occlusion regions assigns motion vectors to correct motion vectors with backward predictions when co located blocks of an occlusion region are not pointed to by any correct motion vectors and with forward predictions otherwise.

8. The method of claim 1, wherein the residual energy is calculated using both luminance and chrominance information.

9. The method of claim 8, wherein said step of developing initial classifies motion vectors as reliable, possible reliable and unreliable by comparing the residual energy to a threshold and classifying motion vectors of intra-coded blocks as unreliable;

classifying motion vectors of blocks having a residual energy meeting or exceeding the threshold as unreliable;

classifying the motion vector of any block not otherwise determined unreliable as possibly reliable if that block has an block with an unreliable motion vector in its macroblock or an adjacent macroblock; and otherwise, classifying blocks as reliable.

10. The method of claim 9, wherein said step of merging blocks merges unreliable motion vectors.

11. The method of claim 8, wherein said step of developing a reliability classification further develops a motion vector correlation classification and wherein said step of developing a merging map uses both the vector reliability classification and the motion vector correlation classification to develop the merging map.

12. The method of claim 8, further comprising a step of classifying occlusion regions after said step of refining, wherein said step of classifying occlusion regions assigns motion vectors to correct motion vectors with backward predictions when co located blocks of an occlusion region are not pointed to by any correct motion vectors and with forward predictions otherwise.

13. The method of claim 1, further comprising a step of conducting motion compensated frame interpolation using motion vectors determined by said steps of selecting and iteratively refining.

14. The method of claim 1, further comprising a step of determining motion vector correlation levels, and wherein said step of merging initially maintains separate reliability and correlation merging maps and said step of selecting is conducted after the correlation map is used to test vectors of blocks deemed reliable based upon.

15. The method of claim 1, wherein motion vectors are classified iteratively as unreliable, reliable or possible reliable based upon residual energy levels and said step of merging merges adjacent unreliable blocks.

16. The method of claim 1 wherein said step of refining applies a reliability and similarity constrained median filter.

17. The method of claim 1, wherein said step of smoothing uses a smaller block size and conducts smoothing by minimizing a smoothness measure that is the sum of smoothness measured in north, south, east, west, diagonal and center directions.

18. The method of claim 16, further comprising a step of classifying occlusion regions after said step of refining, wherein said step of classifying occlusion regions assigns motion vectors to correct motion vectors with backward predictions when co located blocks of an occlusion region are not pointed to by any correct motion vectors and with forward predictions otherwise.

* * * * *

UNITED STATES PATENT AND TRADEMARK OFFICE
CERTIFICATE OF CORRECTION

PATENT NO. : 8,605,786 B2
APPLICATION NO. : 12/670041
DATED : December 10, 2013
INVENTOR(S) : Truohg Nguyen et al.

It is certified that error appears in the above-identified patent and that said Letters Patent is hereby corrected as shown below:

On the Title Page:
Item (56) References Cited

| | |
|---|---|
| Page 3, Right Column, line 19 | Please delete "biodirectional" and insert --bidirectional-- therefor. |
| Page 3, Right Column, line 40 | Please delete "ZHAi" and insert --Zhai-- therefor. |
| Page 3, Right Column, line 42 | Please delete "rediction montioncompensated" and insert --prediction motion-compensated-- therefor. |

In the Specification:

| | |
|---|---|
| Col. 3, line 9 | Please delete "Single" and insert --single-- therefor. |
| Col. 3, line 14 | Please delete "measure" and insert --measuring-- therefor. |
| Col. 5, line 18 | Please delete "$E_{m,n}.$" and insert --$E_{m,n}$-- therefor. |
| Col. 5, line 27 | Before "where", please delete "is". |
| Col. 5, line 37 | Please delete "$E_{m,n}.$" and insert --$E_{m,n}$-- therefor. |
| Col. 5, line 38 | Please delete "$E_{m,n},$" and insert --$E_{m,n}$-- therefor. |
| Col. 5, line 63 | Please delete "$E_{m,n}.$" and insert --$E_{m,n}$-- therefor. |
| Col. 6, line 41 | Before "are located", please delete "of". |
| Col. 6, line 45 | Please delete "crated" and insert --created-- therefor. |
| Col. 6, line 48 | After "can", please insert --be--. |
| Col. 7, line 31 | Please delete "30" and insert --30-- therefor. |
| Col. 8, line 14 | Please delete " $\|f_{t-1}(x + \tfrac{1}{2}v_x \cdot y + \tfrac{1}{2}v_y) - f_{t+1}(x - \tfrac{1}{2}v_x \cdot y - \tfrac{1}{2}v_y)\|$ " and insert -- $\|f_{t-1}(x + \tfrac{1}{2}v_x, y + \tfrac{1}{2}v_y) - f_{t+1}(x - \tfrac{1}{2}v_x, y - \tfrac{1}{2}v_y)\|$ -- therefor. |
| Col. 8, line 48 | After "marked", please insert --by--. |
| Col. 10, line 59 | After "below", please delete "a". |
| Col. 11, line 42 | Before "the example", please delete "in" and insert --In-- therefor. |

Signed and Sealed this
Fourth Day of November, 2014

Michelle K. Lee
*Deputy Director of the United States Patent and Trademark Office*

CERTIFICATE OF CORRECTION (continued)
U.S. Pat. No. 8,605,786 B2

In the Specification:

| | |
|---|---|
| Col. 12, line 8 | Please delete "$\|V^1_{m,n} - V^3_{m,n}-\|^2$" and insert -- $\|V^1_{m,n} - V^3_{m,n-1}\|^2$ -- therefor. |
| Col. 14, line 21 | Please delete "$L_{1and}L_3$" and insert --$L_1$ and $L_3$-- therefor. |
| Col. 15, line 41 | Please delete "$\epsilon_2$." and insert --$\epsilon_2$-- therefor. |
| Col. 19, line 25 | After "to make", please insert --sure--. |
| Col. 19, line 45 | After "movement", please insert a --.--. |
| Col. 20, line 14 | After "happen", please insert --and--. |

In the Claims:

| | |
|---|---|
| Col. 21, line 5, Claim 3 | Please delete "an" and insert --a-- therefor. |
| Col. 21, line 30, Claim 9 | Please delete "possible" and insert --possibly-- therefor. |
| Col. 21, line 39, Claim 9 | Please delete "an" and insert --a-- therefor. |
| Col. 22, line 25, Claim 15 | Please delete "possible" and insert --possibly-- therefor. |

UNITED STATES PATENT AND TRADEMARK OFFICE
CERTIFICATE OF CORRECTION

PATENT NO.        : 8,605,786 B2
APPLICATION NO.   : 12/670041
DATED             : December 10, 2013
INVENTOR(S)       : Truong Nguyen et al.

It is certified that error appears in the above-identified patent and that said Letters Patent is hereby corrected as shown below:

On the Title Page:
Item (56) References Cited

| | |
|---|---|
| Page 3, Right Column, line 19 | Please delete "biodirectional" and insert --bidirectional-- therefor. |
| Page 3, Right Column, line 40 | Please delete "ZHAi" and insert --Zhai-- therefor. |
| Page 3, Right Column, line 42 | Please delete "rediction montioncompensated" and insert --prediction motion-compensated-- therefor. |

In the Specification:

| | |
|---|---|
| Col. 3, line 9 | Please delete "Single" and insert --single-- therefor. |
| Col. 3, line 14 | Please delete "measure" and insert --measuring-- therefor. |
| Col. 5, line 18 | Please delete "$E_{m,n}.$" and insert --$E_{m,n}$-- therefor. |
| Col. 5, line 27 | Before "where", please delete "is". |
| Col. 5, line 37 | Please delete "$E_{m,n}.$" and insert --$E_{m,n}$-- therefor. |
| Col. 5, line 38 | Please delete "$E_{m,n}$," and insert --$E_{m,n}$-- therefor. |
| Col. 5, line 63 | Please delete "$E_{m,n}.$" and insert --$E_{m,n}$-- therefor. |
| Col. 6, line 41 | Before "are located", please delete "of". |
| Col. 6, line 45 | Please delete "crated" and insert --created-- therefor. |
| Col. 6, line 48 | After "can", please insert --be--. |
| Col. 7, line 31 | Please delete "30" and insert --30-- therefor. |
| Col. 8, line 14 | Please delete " $\|f_{t-1}(x+\frac{1}{2}v_x \cdot y+\frac{1}{2}v_y)-f_{t+1}(x-\frac{1}{2}v_x \cdot y-\frac{1}{2}v_y)\|$ " and insert -- $\|f_{t-1}(x+\frac{1}{2}v_x,y+\frac{1}{2}v_y)-f_{t+1}(x-\frac{1}{2}v_x,y-\frac{1}{2}v_y)\|$ -- therefor. |
| Col. 8, line 48 | After "marked", please insert --by--. |
| Col. 10, line 59 | After "below", please delete "a". |
| Col. 11, line 42 | Before "the example", please delete "in" and insert --In-- therefor. |

This certificate supersedes the Certificate of Correction issued November 4, 2014.

Signed and Sealed this
Seventeenth Day of February, 2015

Michelle K. Lee
*Deputy Director of the United States Patent and Trademark Office*

CERTIFICATE OF CORRECTION (continued)

U.S. Pat. No. 8,605,786 B2

In the Specification:

| | |
|---|---|
| Col. 12, line 8 | Please delete "$\|V_{m,n}^1 - V_{m,n}^3\|^2$" and insert -- $\|V_{m,n}^2 - V_{m,n-1}^3\|^2$ -- therefor. |
| Col. 14, line 21 | Please delete "$L_{1 and}L_3$" and insert --$L_1$ and $L_3$-- therefor. |
| Col. 15, line 41 | Please delete "$\epsilon_2$." and insert --$\epsilon_2$-- therefor. |
| Col. 19, line 25 | After "to make", please insert --sure--. |
| Col. 19, line 45 | After "movement", please insert a --.--. |
| Col. 20, line 14 | After "happen", please insert --and--. |

In the Claims:

| | |
|---|---|
| Col. 21, line 5, Claim 3 | Please delete "an" and insert --a-- therefor. |
| Col. 21, line 30, Claim 9 | Please delete "possible" and insert --possibly-- therefor. |
| Col. 21, line 39, Claim 9 | Please delete "an" and insert --a-- therefor. |
| Col. 22, line 25, Claim 15 | Please delete "possible" and insert --possibly-- therefor. |